US011701590B2

(12) United States Patent
Hrinčár et al.

(10) Patent No.: US 11,701,590 B2
(45) **Date of Patent: *Jul. 18, 2023**

(54) PLAYER-TRACKING VIDEO GAME

(71) Applicant: Meta Platforms Technologies, LLC, Menlo Park, CA (US)

(72) Inventors: Vladimír Hrinčár, Prague (CZ); Ján Ilavský, Prague (CZ)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,415

(22) Filed: Dec. 15, 2021

(65) Prior Publication Data

US 2022/0105433 A1 Apr. 7, 2022

Related U.S. Application Data

(63) Continuation of application No. 16/926,572, filed on Jul. 10, 2020, now Pat. No. 11,235,245, which is a (Continued)

(51) Int. Cl.

*A63F 13/577* (2014.01)
*A63F 13/211* (2014.01)

(Continued)

(52) U.S. Cl.

CPC .......... *A63F 13/577* (2014.09); *A63F 13/211* (2014.09); *A63F 13/212* (2014.09);

(Continued)

(58) Field of Classification Search

None

See application file for complete search history.

(56) References Cited

U.S. PATENT DOCUMENTS 6,200,138 B1 3/2001 Ando et al.
10,780,349 B2 9/2020 Hrincár et al.

(Continued)

OTHER PUBLICATIONS

"Center of the World," Encyclopedia.com [Online], [Retrieved on Jul. 30, 2020], 7 pages, Retrieved from the Internet: URL: https://www.encyclopedia.com/environment/encyclopedias-almanacs-transcripts-and-maps/center-world.

(Continued)

*Primary Examiner* — Jason T Yen

(74) *Attorney, Agent, or Firm* — Potomac Law Group, PLLC

(57) ABSTRACT

A rhythm-based video game ("game") is disclosed. In the game, a player slashes blocks representing musical beats using a pair of energy blades resembling a lightsaber. A gaming console renders multiple digital objects, e.g., digital blocks, digital mines and digital obstacles, that are approaching a player in a virtual space. The gaming console also renders a digital representation of an instrument, e.g., a lightsaber ("digital saber"), using which the player slashes, cuts or otherwise interacts with the digital blocks to cause a digital collision between the digital saber and the digital blocks. The player can score by slashing the digital blocks, not hitting the digital mines and avoiding the digital obstacles. The game presents the player with a stream of approaching digital objects in synchronization with music, e.g., a song's beats, being played in the game. The pace at which the digital blocks approach the player increases with the beats.

20 Claims, 19 Drawing Sheets

First Digital Saber 230
Proximate End 232
Digital Obstacle 245
Distal End 215
Digital Block 220
Direction Indicator 225
Digital Mine 240
Player 110
3D Virtual Space 205
Second Digital Saber 235

In practice, multiple objects approach user's at a given time. The more accurate the user is, the better the user's score.

Related U.S. Application Data continuation of application No. 16/195,404, filed on Nov. 19, 2018, now Pat. No. 10,780,349.

(60) Provisional application No. 62/755,468, filed on Nov. 3, 2018.

(51) Int. Cl.

| | |
|---|---|
| ***A63F 13/212*** | (2014.01) |
| ***A63F 13/219*** | (2014.01) |
| ***G06F 3/01*** | (2006.01) |
| ***A63F 13/24*** | (2014.01) |
| ***A63F 13/814*** | (2014.01) |
| ***G06T 19/00*** | (2011.01) |
| ***A63F 13/235*** | (2014.01) |
| ***A63F 13/25*** | (2014.01) |
| ***A63F 13/428*** | (2014.01) |
| ***A63F 13/54*** | (2014.01) |
| ***A63F 13/57*** | (2014.01) |
| *G06F 3/0346* | (2013.01) |

(52) U.S. Cl.

CPC .......... *A63F 13/219* (2014.09); *A63F 13/235* (2014.09); *A63F 13/24* (2014.09); *A63F 13/25* (2014.09); *A63F 13/428* (2014.09); *A63F 13/54* (2014.09); *A63F 13/57* (2014.09); *A63F 13/814* (2014.09); *G06F 3/011* (2013.01); *G06T 19/003* (2013.01); *A63F 2300/105* (2013.01); *A63F 2300/1093* (2013.01); *A63F 2300/305* (2013.01); *A63F 2300/643* (2013.01); *A63F 2300/66* (2013.01); *A63F 2300/8082* (2013.01); *G06F 3/012* (2013.01); *G06F 3/0346* (2013.01); *G06T 19/006* (2013.01); *G06T 2210/21* (2013.01)

(56) References Cited

U.S. PATENT DOCUMENTS

| | | | | |
|---|---|---|---|---|
| 10,950,055 | B2 | 3/2021 | Hrincar et al. | |
| 2002/0160823 | A1 | 10/2002 | Watabe et al. | |
| 2007/0211025 | A1* | 9/2007 | Sato | G06F 3/0346 345/158 |
| 2007/0243915 | A1 | 10/2007 | Egozy et al. | |
| 2008/0064500 | A1 | 3/2008 | Satsukawa et al. | |
| 2008/0300055 | A1 | 12/2008 | Lutnick et al. | |
| 2009/0117958 | A1* | 5/2009 | Ueshima | A63F 13/213 463/8 |
| 2010/0151948 | A1 | 6/2010 | Vance et al. | |
| 2011/0003639 | A1 | 1/2011 | Takehiro | |
| 2011/0287842 | A1 | 11/2011 | Yamada et al. | |
| 2013/0113826 | A1 | 5/2013 | Miyazaki | |
| 2013/0194182 | A1 | 8/2013 | Tarama et al. | |
| 2013/0203492 | A1* | 8/2013 | Yum | A63F 13/44 463/31 |
| 2016/0187974 | A1* | 6/2016 | Mallinson | G06F 1/163 463/32 |
| 2016/0195940 | A1* | 7/2016 | Hall | A63F 13/213 345/158 |
| 2017/0266551 | A1* | 9/2017 | Baba | A63F 13/428 |
| 2017/0329515 | A1 | 11/2017 | Clement et al. | |
| 2018/0108179 | A1* | 4/2018 | Tomlin | G06F 3/0346 |
| 2019/0243472 | A1* | 8/2019 | Stafford | A63F 13/23 |
| 2020/0030699 | A1* | 1/2020 | Wilson | A63F 13/428 |
| 2020/0139226 | A1 | 5/2020 | Hrincar et al. | |
| 2020/0139240 | A1 | 5/2020 | Hrincar et al. | |
| 2020/0143595 | A1 | 5/2020 | Hrincar et al. | |

OTHER PUBLICATIONS

Jagneaux D., "Lightsabers Come to Robo Recall with this Fan-Made Star Wars Mod," Uploadvr.com [online], Apr. 4, 2017, 2 pages, Retrieved from the Internet: URL: https://uploadvr.com/robo-recall-star-wars-mod/.

"Je teste Beat Saber@Gamescom 2017—Full Run," Youtube [Online], Aug. 28, 2017, 2 pages, Retrieved from the Internet: URL: https://www.youtube.com/watch?v=LDxCv8X1w4Y.

"Osu! The Game," Youtube [Online], Sep. 16, 2007 [Retrieved on Jul. 22, 2019], 15 pages, Retrieved from the Internet: URL: https://www.youtube.com/watchv=kwoR1TKQF4Y.

"Speed Slice—Wii Sports Resort Wiki Guide—IGN," Sep. 12, 2012 [Retrieved on Oct. 30, 2019], 7 pages, Retrieved from the Internet: URL: https://www.ign.com/wikis/wii-sports-resort/Speed_Slice#Speed_Slice.

TOMMYT999., "Virtual Reality Lightsaber + Music = Beat Saber VR Gameplay," Youtube [Online], May 19, 2018, 1 page, Retrieved from the Internet: URL:www.youtube.com/watchv=0V623RJgA6s.

"SW Mod Update for Robo Recall," MGS Studio, Youtube [Online], Mar. 12, 2017, 1 page, Retrieved from the Internet: URL: www.youtube.com/watchv=m32d_Yshp38&feature=you.tube.

"Wii Sports Resort—Swordplay Speed Slice vs. Champion Matt + All Stamps," Youtube [Online], Nov. 15, 2015, 9 pages, Retrieved from the Internet: URL: https://www.youtube.com/watch?v=tO_-SBUDLlg.

* cited by examiner

Figure 13:
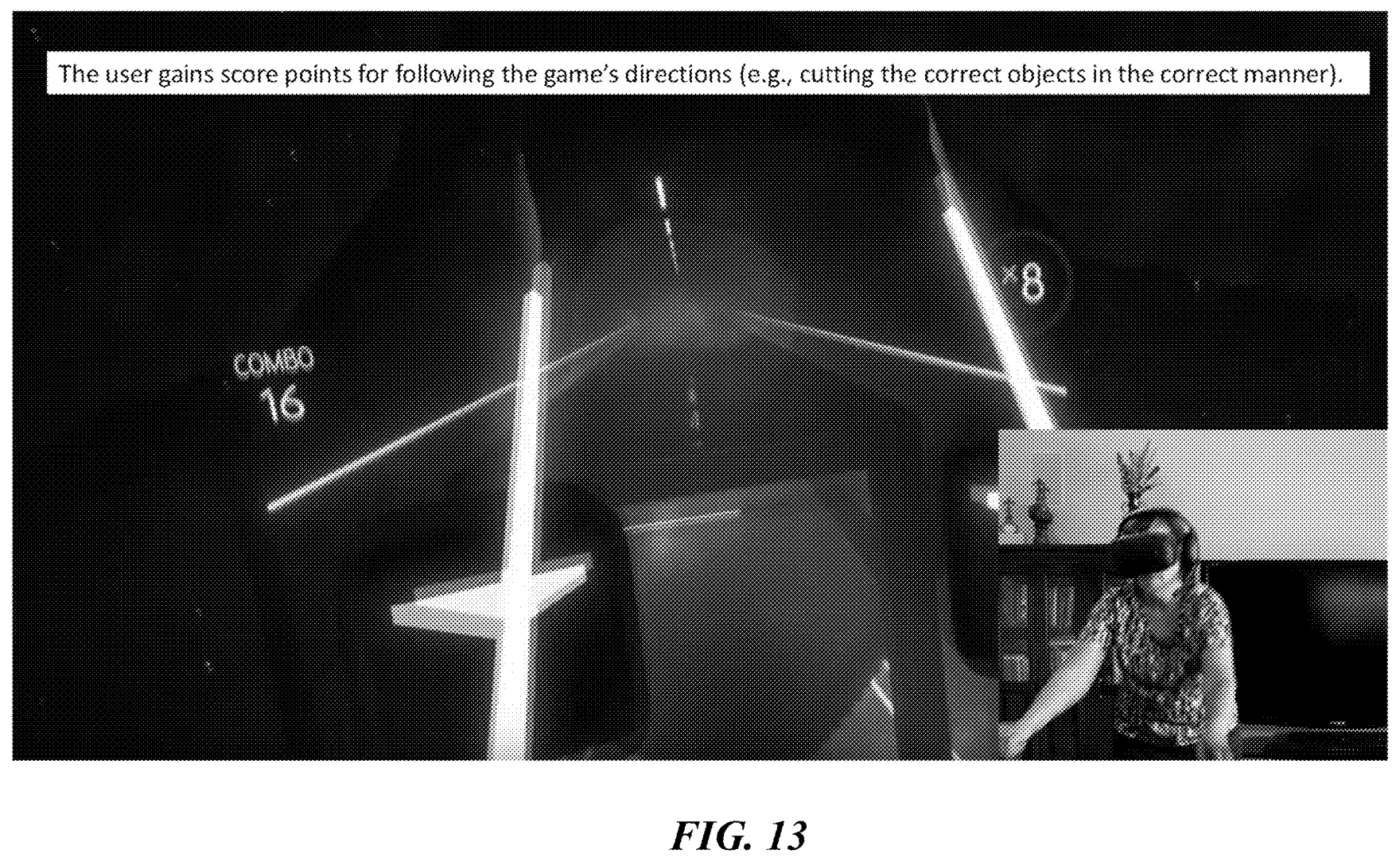

The user gains score points for following the game's directions (e.g., cutting the correct objects in the correct manner).

x8

COMBO
16

PLAYER-TRACKING VIDEO GAME

CROSS-REFERENCE TO RELATED APPLICATION(S)

The present application is a continuation of U.S. patent application Ser. No. 16/926,572, entitled "PLAYER-TRACKING VIDEO GAME,", which is a continuation of U.S. patent application Ser. No. 16/195,404, entitled "PLAYER-TRACKING VIDEO GAME," filed Nov. 19, 2018 and now U.S. Pat. No. 10,780,349, which claims the benefit of U.S. Provisional Patent Application No. 62/755,468, entitled "VIDEO GAME INCLUDING BODY TRACKING AND VIRTUAL OBJECTS," and filed Nov. 3, 2018, which are incorporated herein in their entireties.

TECHNICAL FIELD

The disclosure is related to video games, and more specifically to video games that track the movements of the player.

BACKGROUND

A player-tracking video game is one where a user's movements (e.g., of their head, body, arms, wrists, hands, or legs) provide meaningful controls to the game. Player-tracking games take a variety of forms and often include music video games.

A music video game is a video game where the gameplay is meaningfully and often almost entirely oriented around the player's interactions with a musical score or individual songs. Music video games may take a variety of forms and are often grouped with puzzle games due to their common use of "rhythmically generated puzzles". Music video games are distinct from purely audio games in that they feature a visual feedback, to lead the player through the game's soundtrack, although eidetic music games can fall under both categories.

BRIEF DESCRIPTION OF THE DRAWINGS

FIG. 9 is a screenshot of a player view of the 3D virtual space generated by the gaming console, consistent with various embodiments.

FIG. 11 is a screenshot of a GUI with instructions to the player, consistent with various embodiments.

FIG. 12A is a screenshot of a GUI with instructions to the player, consistent with various embodiments.

FIG. 13 is a screenshot of a GUI with instructions to the player, consistent with various embodiments.

FIG. 15 is a screenshot of a GUI showing multiple digital objects approaching the player in the 3D virtual space, consistent with various embodiments.

DETAILED DESCRIPTION

Figure 1:
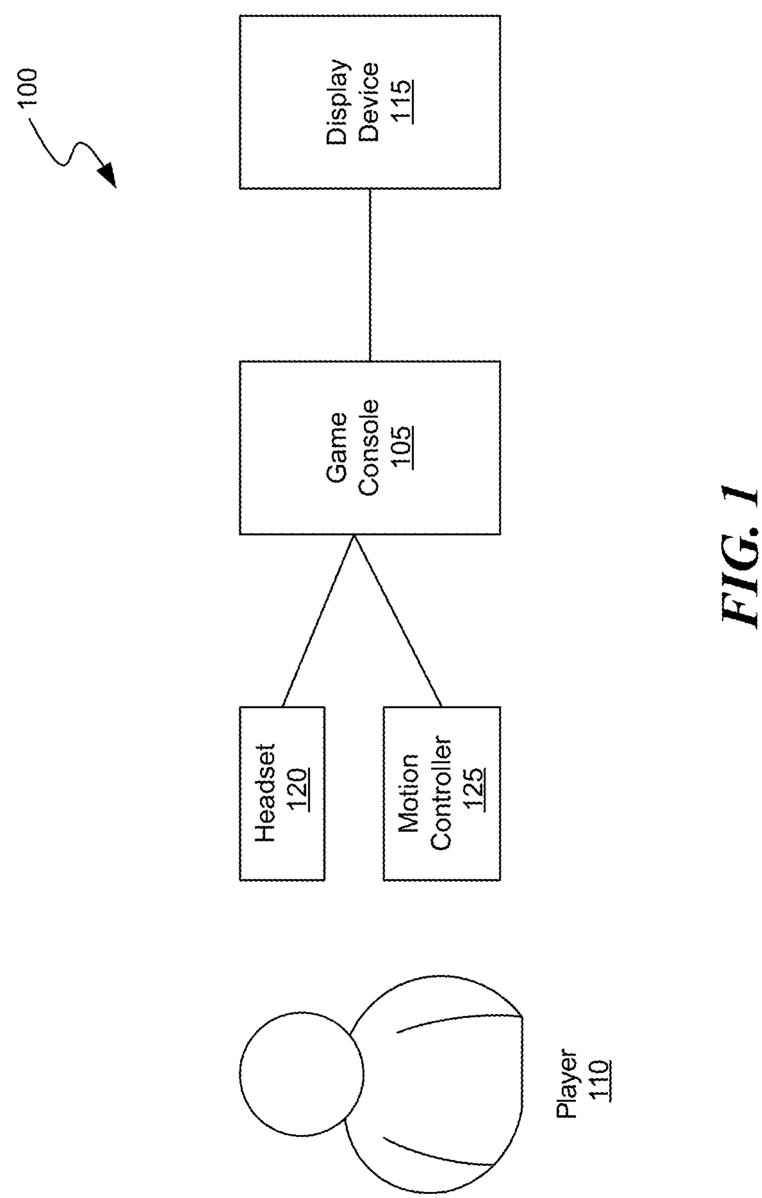
FIG. 1 is a block diagram of an environment in which a rhythm-based video game can be implemented.

The disclosure is related to a video game ("game"). In the game a player interacts with digital objects that approach the user in a 3D corridor. Interaction occurs via digital collision between a digital element controlled by the player. Control of the digital element is based on body tracking. In some embodiments, body tracking is performed via a worn or held peripheral that tracks its own movement relative some other reference point. In some embodiments, a depth camera or room-mapping cameras (e.g., Playstation Camera, Microsoft Kinect, LeapMotion, or equivalents) captures video of the player and uses computer vision techniques to identify body positions of the user. The game presents the player with a stream of approaching digital objects and the user causes the digital element to collide with the digital objects based on use of body tracking. Digital collisions with different types of digital objects and from different angles cause a variety of game actions to occur. In some embodiments, the game further tracks the motion of the user's body and shifts a player location in game corresponding to body movements. Movement of the player location enables the player to avoid digital obstacles.

An embodiment of the disclosure is related to a rhythm-based video game. In the rhythm-based video game a player slashes blocks representing musical beats using one or a pair of energy blades resembling a lightsaber (the digital element). A gaming console renders multiple digital objects, e.g., a digital representation of a block ("digital block" or "block"), that are moving in a specified direction, e.g., in a direction towards a user or player. The gaming console also renders a digital representation of an instrument, e.g., a digital representation of a sword resembling a lightsaber ("digital saber"), using which the player slashes, cuts or otherwise interact with the digital blocks to cause a digital collision between the digital saber and the digital blocks. The game presents the player with a stream of approaching digital blocks in synchronization with beats of music, e.g., a song's beats and notes, being played in the game. As the beat picks up in the music, the pace at which the digital blocks approach the player can increase.

A game action occurs in response to the digital collision. The game action can be any of an increase or decrease in score of the player, an increase or decrease in energy of the player, a gain or loss of life of the player in the game, an increase or decrease in a rate at which the score changes, an increase or decrease in the pace at which the blocks move towards the player, etc. The game can end based on multiple factors, such as after a specified time period, when the player runs out of energy or lives, or when the player issues a command to stop the game. The video game can be implemented as a two-dimensional (2D) video game, a three-dimensional (3D) video game, a virtual reality (VR) game, or an augmented reality (AR) game. In some embodiments, the gaming console is configured to implement the video game as a VR game.

FIG. 1 is a block diagram of an environment 100 in which the rhythm-based video game can be implemented. The environment 100 includes a gaming console 105 which executes a rhythm-based video game, such as the one described above. In some embodiments, the gaming console 105 can be a computing device having a processor and memory, and the processor executes instructions stored in the memory to present the game to a player 110 on a display device 115. The display device 115 supports 2D and/or 3D rendering of the game. In some embodiments, the player 110 may have to wear 3D glasses (not illustrated) to experience the game in 3D. The gaming console 105 supports a VR implementation of the game. In the VR implementation, an apparatus such as a headset 120 may have to be used by the player 110 to experience the game in VR.

The headset 120 is head-mounted device, which is used to track the orientation or position of a body or head of the player 110. The headset 120 has one or more display devices that presents the game in VR. The headset 120 can also have one or more sensors that are used to determine and transmit co-ordinates of the position of the player 110 to the gaming console 105. Examples of such sensors include gyroscopes, accelerometers, structured light systems, depth sensing cameras, magnetic position sensors, and eye tracking sensors. Sensors can be located in one or more locations, e.g., integrated with the headset 120, be worn by the player 110 anywhere on the body, integrated with a motion controller 125, or part of other equipment worn by the player 110. The gaming console 105 establishes the position of the player 110 in a 3D virtual space by translating the co-ordinates received from the headset 120 to coordinates in the 3D virtual space. The co-ordinates received from the headset 120 can also help in determining different positions or actions of the player 110, e.g., whether the player 110 is sitting, standing, ducking, jumping, moving, etc. The headset 120 may include a microphone to receive any audio input from the player 110 or the surroundings of the player 110. The headset 120 may include one or more speakers that outputs audio to the player 110, such as the song being played in the game. The headset 120 can communicate with the gaming console 105 wirelessly or using wired means.

The environment 100 also includes a hand-held or hand-worn apparatus such as a motion controller 125, which is used to track an orientation, position and movement of the hand of the player 110. The motion controller 125 includes one or more sensors, e.g., such as the ones mentioned above, that track the orientation, position and motion of the hand of the player 110 (examples include an Oculus Touch, a Samsung Gear controller, a PlayStation Move, or a Nintendo Switch controller). In some embodiments, the motion controller includes a magnetic position sensor that senses a position of the motion controller 125 in relation to a non-hand-held peripheral, e.g., headset 120. The motion controller 125 transmits the co-ordinates of the hand and/or the movement of the hand to the gaming console 105, which then translates the movement to the 3D virtual space. The motion controller 125 can also include a haptic feedback mechanism that provides haptic feedback, e.g., when the player 110 slashes the digital block. In some embodiments, the environment 100 may include more than one motion controller 125, e.g., a pair of motion controllers. The player 110 can hold one motion controller in one hand and the other in the other hand. In some embodiments, a single motion controller 125 is held in both hands. In a two-player game one player can hold one motion controller and the other player can hold the other motion controller. The motion controller 125 can be of any shape, size or dimension that is suitable to be held in the hand of a player. The motion controller 125 can communicate with the gaming console 105 wirelessly or using wired means. The motion controller 125 can also communicate with other devices, such as headset 120, wirelessly or using wired means.

Figure 2:
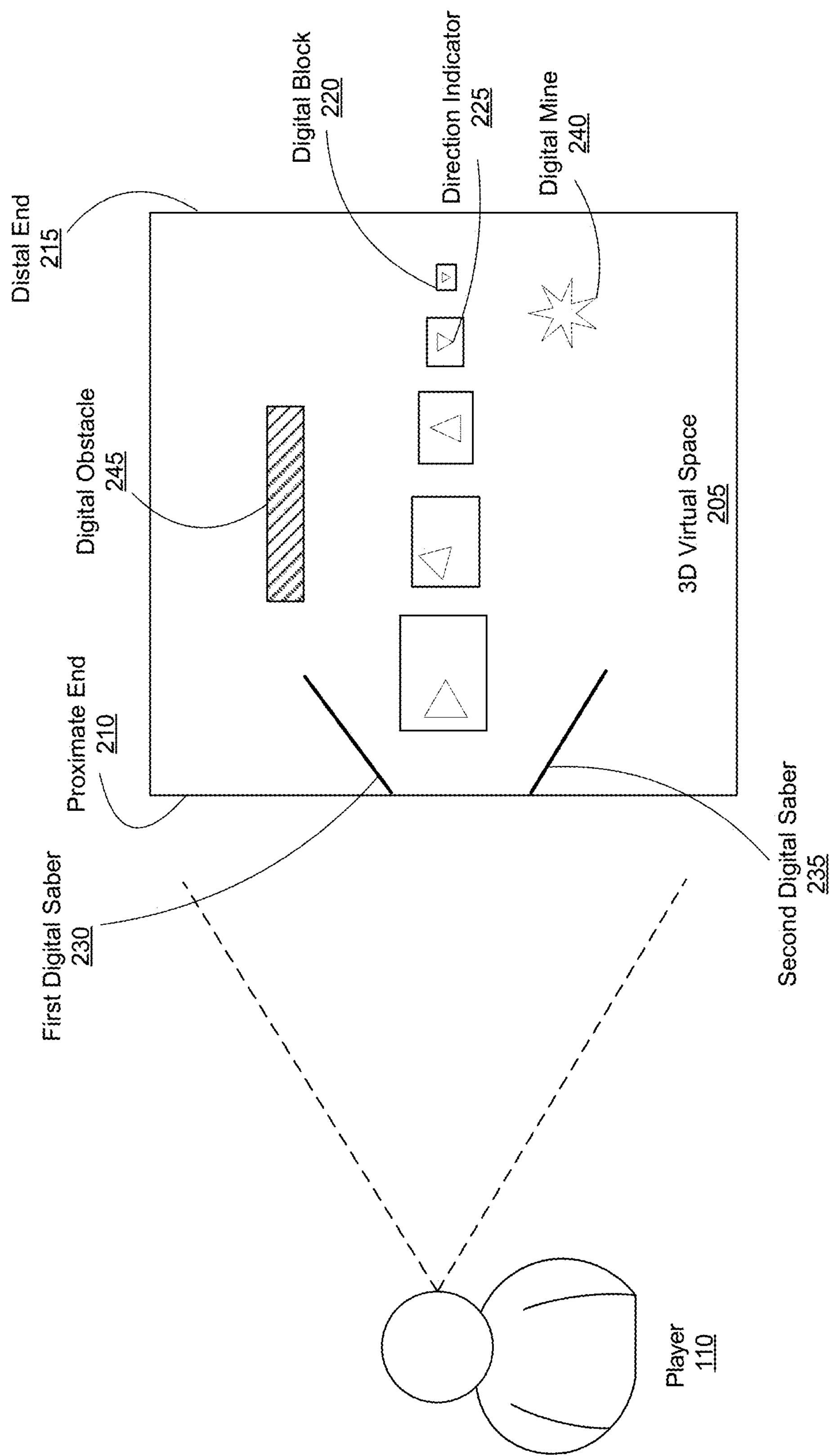
FIG. 2 is a block diagram of a three-dimensional (3D) virtual space in which the game is played, consistent with various embodiments.

In the rhythm-based video game, the gaming console 105 establishes a 3D virtual space, such as the 3D virtual space 205 of FIG. 2. The 3D virtual space 205 includes a position of the player 110, e.g., which is determined based on the co-ordinates of the position of the player 110 obtained from the headset 120. The 3D virtual space 205 includes a proximate end 210 that is proximate to the player 110 and a distal end 215 opposite to the proximate end 210. A portion of the proximate end 210 corresponds to the position of the player 110. In some embodiments, the player may calibrate the controller or the virtual space 205 to themselves. Calibration may be performed by the hardware, or manually by the player.

The gaming console 105 renders multiple digital objects, e.g., a digital block 220, that are approaching the player 110 from the distal end 220. In some embodiments, the digital block 220 may appear bigger in size as it approaches the proximate end 210. The gaming console 105 also renders a digital representation of an instrument, e.g., a digital saber, using which the player 110 can slash, cut or otherwise interact with the digital block 220 to cause a game action to occur in the game. The game presents the player 110 with a stream of the digital blocks in synchronization with beats of music, e.g., a song's beats and notes, being played in the game. As the beat picks up in the music, the pace at which the digital blocks approach the player 110 can increase.

In the VR implementation, the motion controller 125 can be a VR based motion controller, which is represented as a digital saber in the 3D virtual space 205. The player 110 uses a pair of VR motion controllers to wield a pair of digital lightsabers, e.g., a first digital saber 230 and a second digital saber 235, in the 3D virtual space 205 to slash the digital blocks. The digital blocks can be of various types, e.g., a first type and a second type, which the player 110 may interact with using the two different digital sabers. A specific type of digital blocks should be interacted with using a specified digital saber. In some embodiments, the first type of digital blocks can be of a first color and may have to be interacted with using a digital saber of the corresponding color, and the second type of digital blocks can be of a second color and may have to be interacted with using a digital saber of the corresponding color. For example, each digital block is colored red or blue to indicate whether the red or blue digital saber should be used to slash it.

In some embodiments, each of the digital blocks is marked with a direction indicator 225, which indicates the direction to slash through the digital block. For example, a directional indicator 225 such as an arrow can indicate one of eight possible directions to slash through the digital block 220. In another example, a directional indicator 225 such as a dot can indicate that the player 110 may slash through the digital block 220 in any direction. When a digital block is slashed by a digital saber, the digital block is destroyed, and a score is awarded based on one or more factors, e.g., timing accuracy and physical positioning of the cut.

The game can also present digital objects other than digital blocks, which the player 110 should not hit. For example, the game can present a digital object such as a "digital mine" 240 that the player 110 should not hit. In another example, the game can present obstacles such as a digital representation of an oncoming wall ("digital obstacle") 245 that the player 110 or the head of the player 110 should avoid. The player 110 can avoid the digital obstacle 245 approaching the proximate end 210 by moving out of the path of digital obstacle 245, which can be done by stepping to the right or left of the digital obstacle 245 or by ducking below the digital obstacle 245. For example, if the player 110 steps to the right (in the real world) of the oncoming digital obstacle 245, the gaming console 105 shifts at least a portion of the 3D virtual space 205 to the right of the player 110 so that the digital obstacle ends up passing through the left of the player 110 at the proximate end 210.

The sensors worn by the player 110, e.g., in the headset 120, motion controller 125 or elsewhere, can transmit the co-ordinates of the player 110, portion of the body of the player 110, such as a head of the player 110, movements of the player 110, or movements of a portion of the body of the player 110 to the gaming console 105. The gaming console 105 translates the received co-ordinates to the co-ordinates in the 3D virtual space 205 and determines the action of the player 110, e.g., whether there was a digital collision between a digital block and a digital saber, whether there was a digital collision between a digital obstacle and a digital saber, whether there was a digital collision between a digital wall and any portion of the body of the player 110 (which corresponds to a portion of the 3D virtual space in the proximate end 210), whether the player 110 moved out of the path of the approaching digital obstacles, etc., which result in a specified game action.

A game action can occur in response to a digital collision between a digital saber and a digital object. The game action can be any of an increase or decrease in score of the player, an increase or decrease in energy of the player 110, a gain or loss of life of the player 110 in the game, an increase or decrease in a rate at which the score changes, an increase or decrease in the pace at which the digital objects are created or move towards the player 110, etc. Different types of game actions can occur in response to different events. For example, a score of the player 110 can increase in response to a digital collision between a digital block of a specified color and the digital saber of the specified color. In another example, a score of the player 110 can decrease in response to a digital collision between a digital block of a specified color and a digital saber of a color other than the specified color. In another example, a score of the player 110 may increase, or increase by an amount above a threshold, in response to a digital collision between a digital block and a digital saber in which a contact angle of the digital saber with the digital block is consistent with the direction indicated on the digital block.

In another example, a score of the player 110 may not increase, or increase by an amount below a threshold, in response to a digital collision between a digital block and a digital saber in which a contact angle of the digital saber with the digital block is not consistent with the direction indicated on the digital block. In another example, a score of the player 110 may not increase, or increase by an amount below a threshold, in response to a digital collision between a digital block and a digital saber whose collision impact is below a specified threshold.

In some embodiments, the collision impact can be measured as a function of how hard, fast or strong the player 110 swings the motion controller 125 to slash the digital block 220. In another example, a score, energy or life of the player 110 can decrease in response to a digital collision between a digital mine and a digital saber. In another example, a score, energy or life of the player 110 can decrease in response to a digital collision between a digital obstacle and a digital saber or the player 110. In some embodiments, a game action can also occur if there is no digital collision for a specified duration. For example, if the player 110 does not slash through any of the digital blocks for a duration exceeding a specified threshold, a score, energy or life of the player 110 can decrease, or the rate at which the score, energy or life increases can be decreased. The game can be configured to calculate the score, energy, or a life of the player 110 using various factors, including the above specified factors.

The game can end based on one or more factors, such as after a specified time period, when the player runs out of energy or lives, when the player 110 has completed one or more levels of the game, when the music stops playing, or when the player issues a command to stop the game.

As mentioned above, the game can be implemented as a 2D game, 3D game, a VR game, or an AR game. The entities of the environment 100 can be adjusted, adapted or configured for a specific implementation. For example, while the environment 100 described providing the VR gaming experience through the headset 120, in some embodiments, the VR gaming experience can also be created through specially designed rooms with multiple large screens.

In some embodiments, some of the entities of the environment 100 may have to be calibrated before being able to play the game to obtain the coordinates of the position of the player 110. For example, a setup process in the game may ask the player 110 to turn the headset 120 and perform some gestures, such as moving from left to right, right to left, ducking, jumping, or talking. In another example, the setup process in the game may ask the player 110 to move the motion controller in each hand to perform a gesture, such as raising the motion controller, swinging the hand with the motion controller to hit a digital object displayed on the display device 115 or the headset 120. Once the calibration is complete, the gaming console 105 establishes the 3D virtual space 205 after which the player 110 can proceed to play the game.

In some embodiments, the user is able to customize their game experience. Examples include changing the graphical representation on the digital element (the digital sabers) 230/235. The digital sabers 230/235 may change color, change in graphical design and through use of various "skins." The sabers 230/235 may also change in shape or character causing the manner in which the user causes digital collisions to shift. In some embodiments, a player avatar is displayed to the user. The player avatar is customizable using skins and different digital models. In some embodiments, the user is able to generate gameplay via attaching a "beat map" to an audio file. A beat map includes data describing each digital object 220,240,245 that is generated in the 3D virtual space 205, at what point in the audio file the objects 220,240,245 are generated, the speed of the objects 220,240,245, the type/color of each object 220,240,245, the directionality 225 of each object 220,240, 245, and a position and vector in the 3D virtual space 205 of each object 220,240,245. Given a beat map and a corresponding audio file, any song can be played in the game. A digital distribution system may also provide packs or groups of beat maps and audio files to play with the game.

Figure 3:
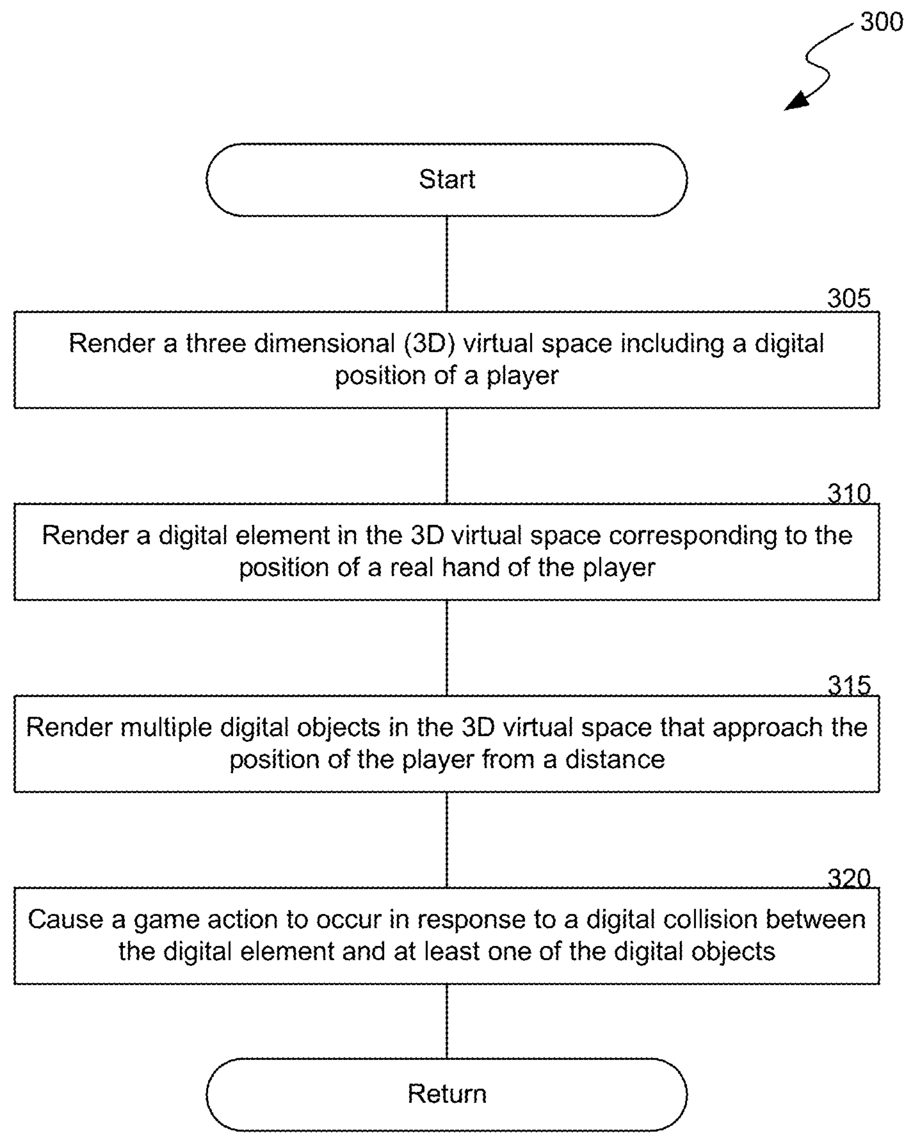
FIG. 3 is a flow diagram of a process for presenting the game to a player, consistent with various embodiments.

FIG. 3 is a flow diagram of a process 300 for presenting the game to a player, consistent with various embodiments. In some embodiments, the process 300 can be implemented in the environment 100 of FIG. 1. The player 110 can complete the setup process to calibrate the motion controller and the headset 120. In some embodiments, the player 110 may need to complete the calibration only once per session, e.g., when the gaming console 105 is powered on and prior to playing a first game and need not calibrate the devices again unless the gaming console 105 is powered off and powered on again. In some embodiments, the devices may have to be calibrated when the player changes. In some embodiments, the devices may have to be calibrated when there are environmental changes around the player 110, e.g., a change in intensity of light in the room where the player 110 plays the game, a change in distance between the player 110 and the gaming console 105, a change in the position of the furniture in the room where the game is played. After the devices are calibrated, the gaming console 105 will have the necessary coordinates to establish the 3D virtual space in which the game is played.

At block 305, the gaming console 105 renders the 3D virtual space 305 in which the game is to be played. The 3D virtual space 305 includes a digital position of the player 110.

At block 310, the gaming console 105 renders a digital element, e.g., a digital saber, in the 3D virtual space 305 relative to the digital position of the player 110. The co-ordinates and the orientation of the digital saber relative to the digital position correspond to an orientation and the co-ordinates of the physical hand of the player 110 relative to the physical body of the player 110. The gaming console 105 obtains the orientation and the co-ordinates of the physical hand of the player 110 relative to the physical body of the player 110 using the motion controller 125 held in the hand of the player 110 and the headset 120 worn by the player 110.

At block 315, the gaming console 105 renders multiple digital objects that approach the digital position of the player 110 from a distance in the 3D virtual space. The digital objects can include digital blocks that the player 110 should slash using the digital element. In some embodiments, the digital objects can include digital mines that the player 110 should not hit, and digital obstacles that the player 110 should avoid.

At block 320, the gaming console 105 causes a game action to occur in response to a digital collision between the digital element and one or more of the digital objects. The different type of game actions that can occur are described at least with reference to FIG. 1.

Figure 4:
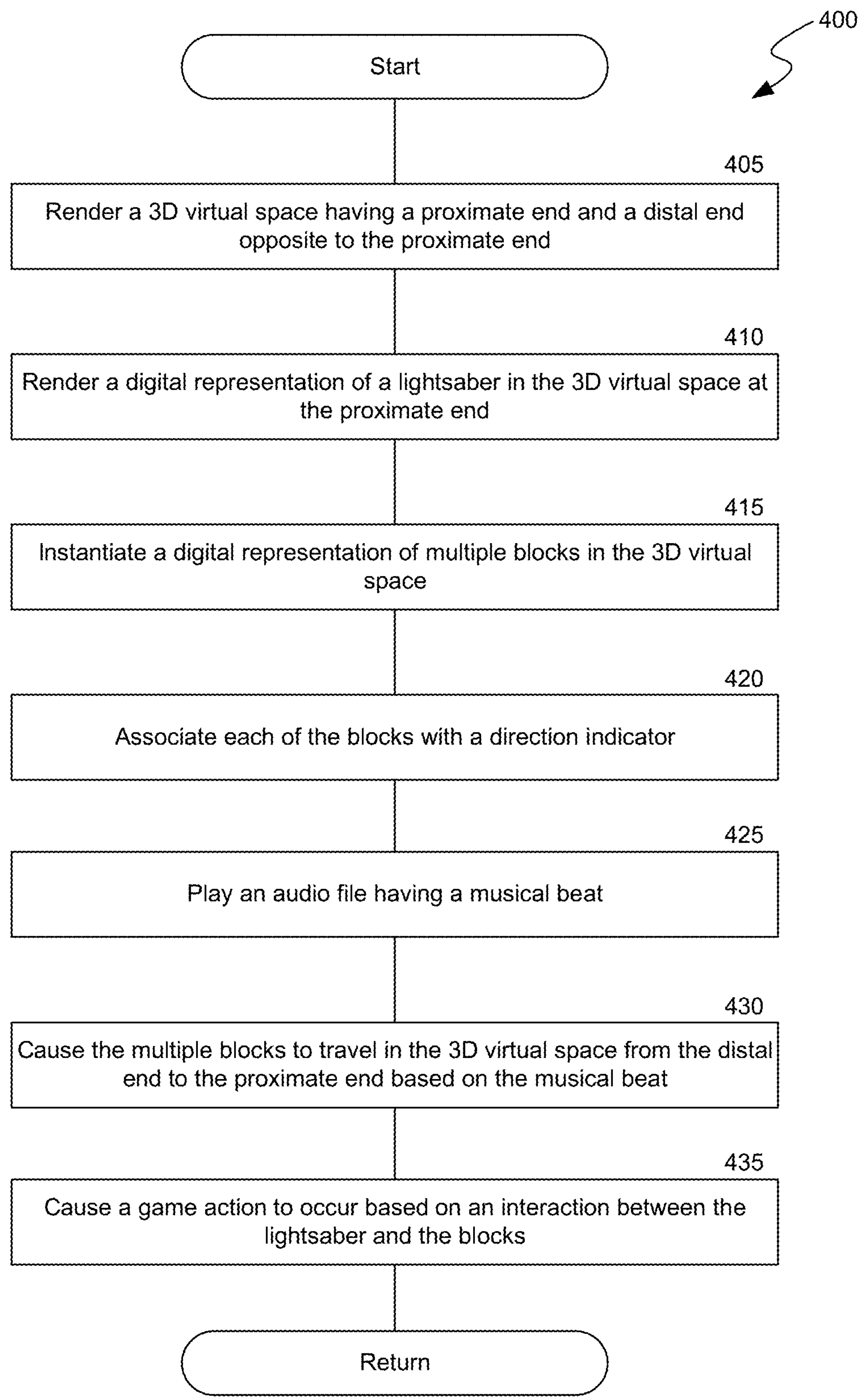
FIG. 4 is a flow diagram of a process for presenting the game to a player, consistent with various embodiments.

FIG. 4 is a flow diagram of a process 400 for presenting the game to a player, consistent with various embodiments. In some embodiments, the process 400 can be implemented in the environment 100 of FIG. 1. The process 400 assumes that the headset 120 and the motion controllers are calibrated. At block 405, the gaming console 105 renders a 4D virtual space in which the game is to be played. The 4D virtual space 205 includes a proximate end 210 that is proximate to the player 110 and a distal end 215 opposite to the proximate end 210. In some embodiments, a portion of the proximate end 210 corresponds to the digital position of the player 110.

At block 410, the gaming console 105 renders a digital representation of an instrument to be used by the player 110, e.g., the first digital saber 230, to play the game. The co-ordinates and the orientation of the first digital saber 230 relative to the digital position of the player 110 correspond to an orientation and the co-ordinates of the physical hand of the player 110 relative to the physical body of the player 110.

At block 415, the gaming console 105 instantiates multiple digital blocks in the 4D virtual space 205.

At block 420, the gaming console 105 associates each of the digital blocks with a direction indicator. In some embodiments, the direction indicator indicates the direction in which the digital block is to be slashed by the player 110.

At block 425, the gaming console 105 plays an audio file having a musical beat, e.g., a song.

At block 430, the gaming console 105 causes the multiple digital objects to travel from the distal end 215 to the proximate end 210 in the 4D virtual space 205 in synchronization with the musical beats. For example, the rate at which the digital blocks are created or the pace at which the digital blocks approach the proximate end 210 depend on the musical beats. As the beat picks up in the song, the pace at which the digital blocks approach the player can increase.

At block 435, the gaming console 105 causes a game action to occur based on an interaction between the first digital saber 230 and one or more of the digital blocks. The different type of game actions that can occur are described at least with reference to FIG. 1.

Figure 5:
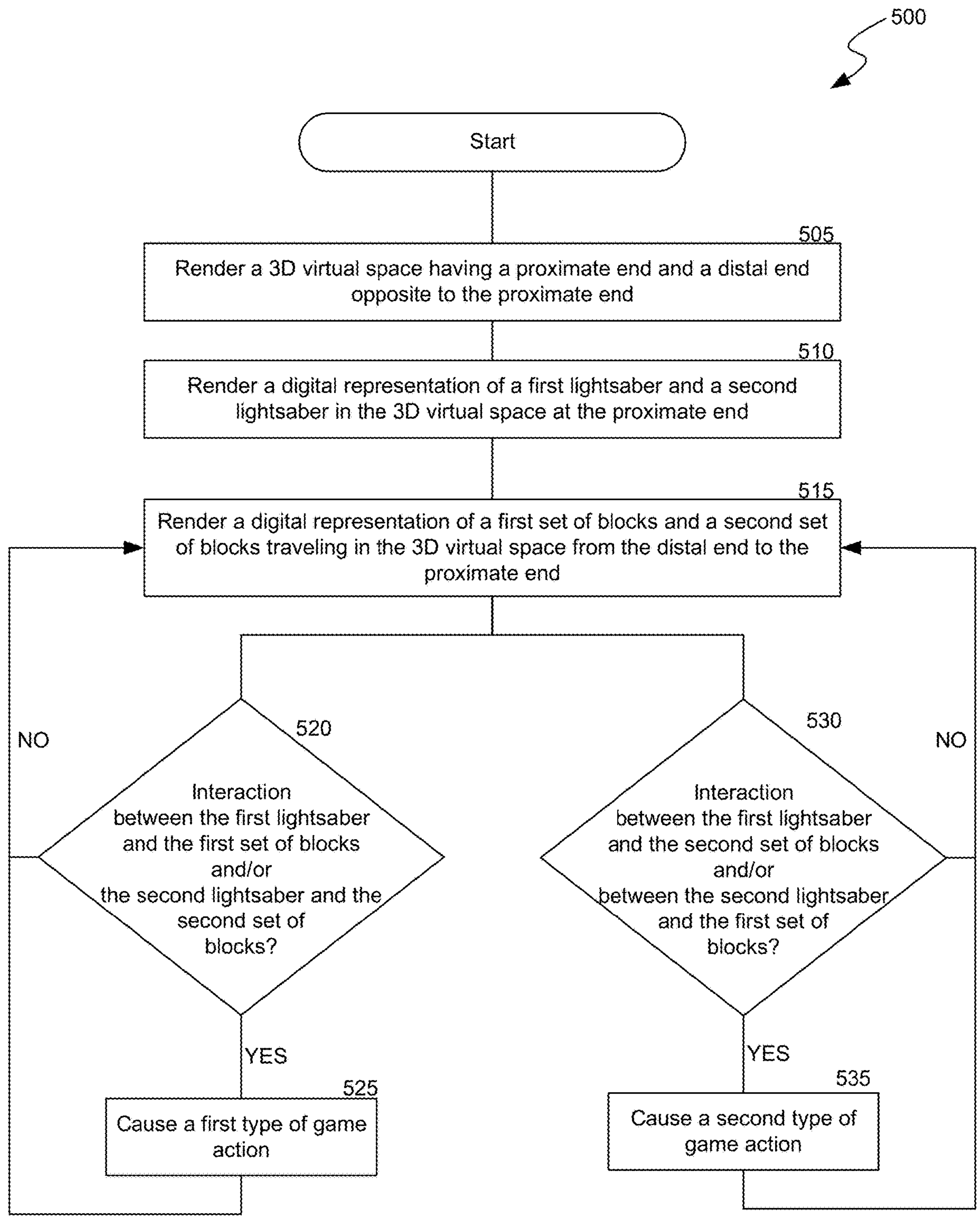
FIG. 5 is a flow diagram of a process for presenting the game to a player, consistent with various embodiments.

FIG. 5 is a flow diagram of a process 500 for presenting the game to a player, consistent with various embodiments. In some embodiments, the process 500 can be implemented in the environment 100 of FIG. 1. The process 500 assumes that the headset 120 and the motion controllers are calibrated. At block 505, the gaming console 105 renders a 3D virtual space in which the game is to be played. The 3D virtual space 205 includes a proximate end 210 that is proximate to the player 110 and a distal end 215 opposite to the proximate end 210. In some embodiments, a portion of the proximate end 210 corresponds to the digital position of the player 110.

At block 510, the gaming console 105 renders a digital representation of instruments to be used by the player 110, e.g., the first digital saber 230 and the second digital saber 235, to play the game. For example, the first digital saber 230 can correspond to the motion controller held by the player 110 in the left hand and the second digital saber 235 can correspond to the motion controller held by the player 110 in the right hand. The co-ordinates and the orientation of the digital sabers relative to the digital position of the player 110 correspond to an orientation and the co-ordinates of the physical hands of the player 110 relative to the physical body of the player 110. The digital sabers can have different characteristics. For example, the first digital saber 230 can be red colored saber and the second digital saber 235 can be a blue colored saber.

At block 515, the gaming console 105 renders multiple digital objects traveling in the 3D virtual space 205 from the distal end 215 to the proximate end 210. The digital blocks can include two different sets of blocks. In some embodiments, the first set of digital blocks can be of a first color and the second set of digital blocks can be of a second color. For example, each digital block is colored red or blue to indicate whether the red or blue digital saber should be used to slash it.

At determination block 520, the gaming console determines whether there was an interaction, e.g., digital collision, between the red digital blocks and the red saber 230 or between the blue digital blocks and the blue saber 235.

If the gaming console 105 determines that at least one of the conditions in block 520 is true, at block 525, the gaming console 105 causes a first type of game action, and the control is transferred to block 515. For example, the first type of game action can be to increase a score of the player 110 in response to a digital collision between a digital block and the digital saber of the same color.

At determination block 530, the gaming console determines whether there was an interaction, e.g., digital collision, between the red digital blocks and the blue saber 235 or between the blue digital blocks and the red saber 230.

If the gaming console 105 determines that at least one of the conditions in block 530 is true, at block 535, the gaming console 105 causes a second type of game action, and the control is transferred to block 515. For example, the second type of game action can be not to increase the score, or decrease the score of the player 110 in response to a digital collision between a digital block and the digital saber of different colors.

Figure 6:
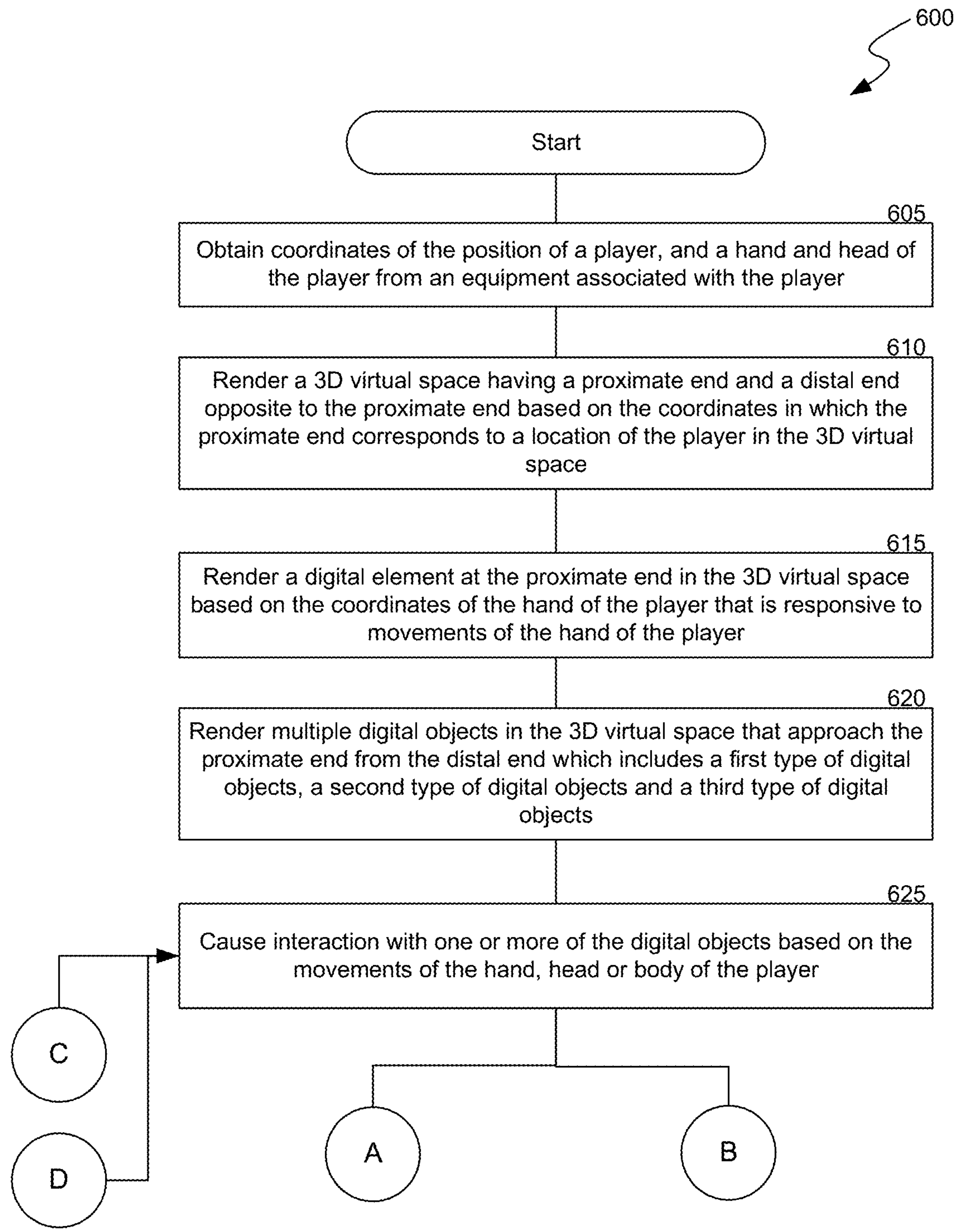
FIG. 6 is a flow diagram of a process for presenting the game to a player, consistent with various embodiments.
Figure 6:
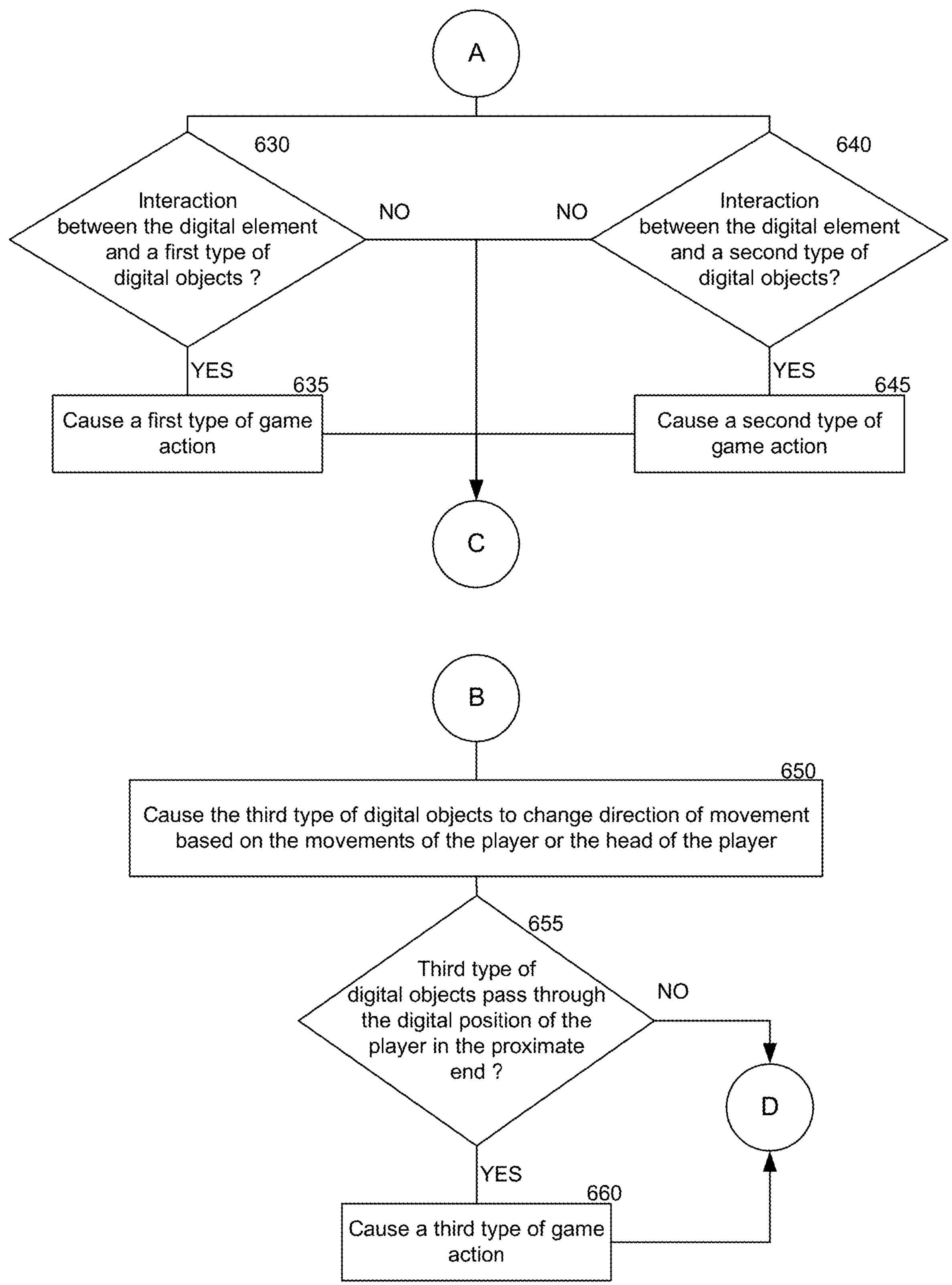

FIG. 6 is a flow diagram of a process 600 for presenting the game to a player, consistent with various embodiments. In some embodiments, the process 600 can be implemented in the environment 100 of FIG. 1. At block 605, the gaming console 105 obtains an orientation and coordinates of the player 110, a hand and head of the player 110 at least from the headset 120 and the motion controller 125.

At block 610, the gaming console 105 renders a 3D virtual space in which the game is to be played. The 3D virtual space 205 is generated based on the co-ordinates received from the headset 120 and the motion controller 125 associated with the player 110. The 3D virtual space 205 includes a proximate end 210 that is proximate to the player 110 and a distal end 215 opposite to the proximate end 210. In some embodiments, a portion of the proximate end 210 corresponds to the digital position of the player 110.

At block 615, the gaming console 105 renders a digital representation of instruments to be used by the player 110, e.g., the first digital saber 230 and the second digital saber 235, at the proximate end 210. The digital saber is responsive to the movements of the hand of the player 110 holding the motion controller 125. The co-ordinates and the orientation of the digital sabers relative to the digital position of the player 110 correspond to an orientation and the co-ordinates of the physical hands of the player 110 relative to the physical body of the player 110.

At block 620, the gaming console 105 renders multiple digital objects traveling in the 3D virtual space 205 from the distal end 215 to the proximate end 210. The digital objects can be of different types. For example, a first type can include digital blocks that the player 110 should slash using the digital saber, a second type can include digital mines that the player 110 should not hit, and a third type can include digital obstacles that the player 110 should avoid.

At block 625, the gaming console 105 causes interaction with the digital objects based on the movement of the hand, head and/or body of the player 110.

At determination block 630, the gaming console 105 determines whether there was an interaction, e.g., digital collision, between a digital block and the digital saber. If yes, at block 635, the gaming console 105 causes a first type of game action. For example, the first type of game action can be to increase a score of the player 110 in response to a digital collision between a digital block and the digital saber. The control is transferred to block 625.

At determination block 640, the gaming console 105 determines whether there was an interaction, e.g., digital collision, between the digital saber and a digital mine. If yes, at block 645, the gaming console 105 causes a second type of game action. For example, the second type of game action can be not to increase the score or decrease the score/energy/life of the player 110 in response to the digital collision between a digital mine and the digital saber. The control is transferred to block 625.

At block 650, the gaming console 105 causes the digital obstacle to change the direction of travel based on actual movements of the player 110 or movements of the head of the player 110.

At determination block 655, the gaming console 105 determines whether the digital obstacle pass through the digital position of the player 110 at the proximate end 210. If yes, at block 660, the gaming console 105 causes a third type of game action. For example, the third type of game action can be to decrease the score/energy/life of the player 110. The control is transferred to block 625.

Figure 7:
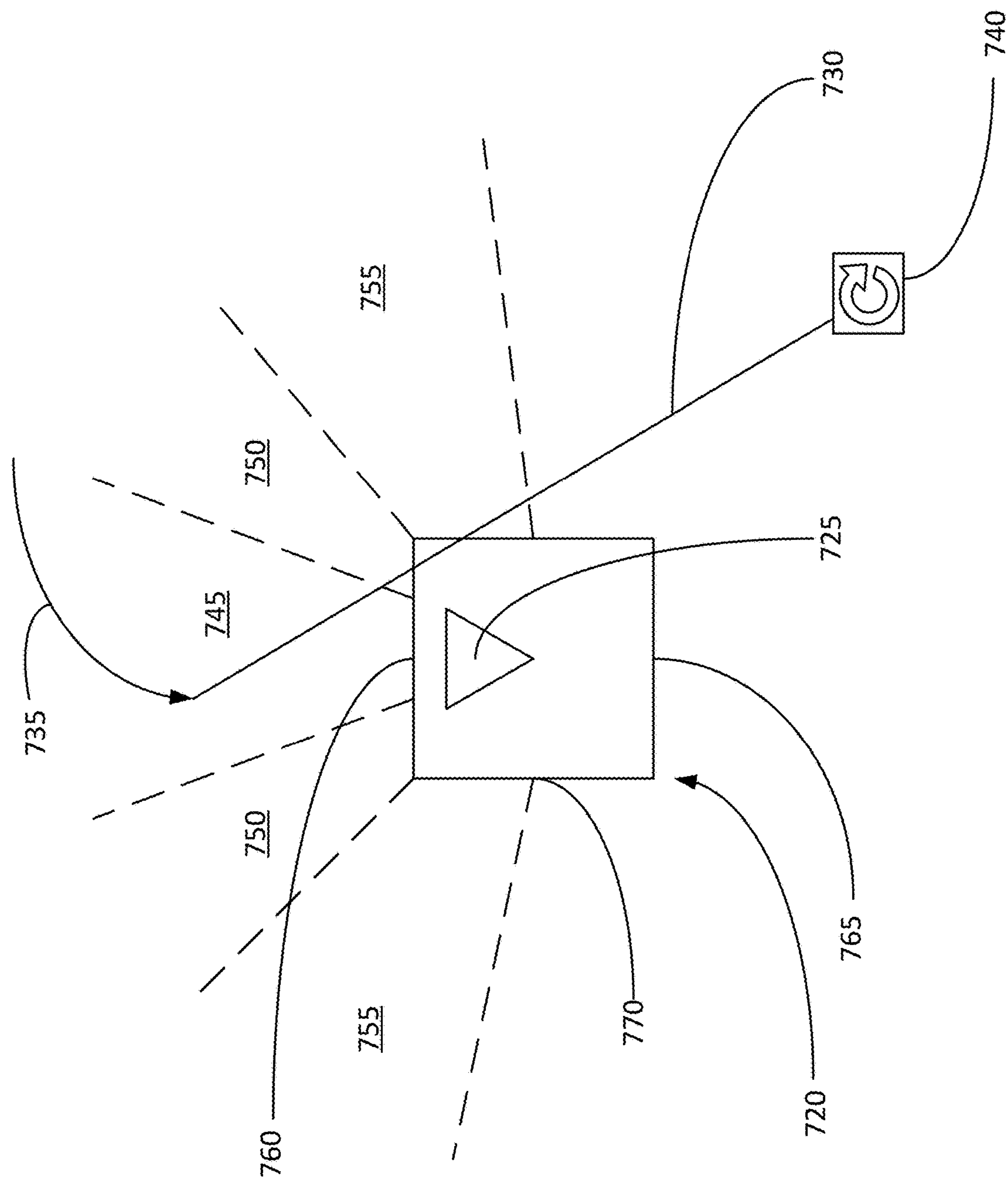
FIG. 7 illustrates variable game actions based on angle and position of incidence between a digital element and a digital object.

FIG. 7 illustrates variable game actions based on angle and position of incidence between a digital element 730 and a digital object 720. The pictured digital object 720 includes a direction indicator 725. In the illustrated example, the digital element 730 is elongated and extends from a control point at the user's hand (as a sword would).

The direction indicator 275 indicates the game's ideal collision direction between the digital element 730 and the digital object 720. Causing a collision using a swing direction 735 that corresponds to the direction indicator 725 results in a positive game action (e.g., rewarding of points), whereas causing a collision at a different direction causes a different game action (e.g., issuing a fault, ending a combo streak, rewarding fewer points than the positive game action, subtracting points).

In some embodiments, angle incidence and/or digital element rotation 740 may affect the type of game action occurring from a collision. Incidence angles 745, 750 and 755 illustrate regions an incoming digital element 730 might collide with the digital object 720. In some embodiments, the game action occurring from a collision is more positive for the user when the collision has an incidence angle 745, 750, 755 closest to on-center (e.g., straight through center "mass" of the digital object 720). For example, the collision may be worth more points depending on where a user strikes the digital object 720 with the digital element 730.

The incidence angles 745, 750, 755 may be used as a region (e.g., plus or minus 0-30 degrees from center) or as an absolute measurement (e.g., exactly 37 degrees right or left of center) where a collision at 0 degrees from center is worth the most points. In some embodiments, instead of, or in addition to incidence angles, entry and exit surfaces are used. Where a collision begins and ends on opposite sides of a digital object 720, the digital element 730 took a relatively straight path through the digital object 720. Taking a straight path through the digital object 720 may provide users with a more positive game action (e.g., more points) than a collision that enters and exits through adjacent sides of the digital object 720. Illustrative of the relatively straight path described above is a collision "cut" that begins on surface 760 and exits through surface 765. A collision that does not use a straight path begins at surface 760 and exits through surface 770; or alternatively, a collision that begins at surface 770 and exits through surface 765. The non-straight path collisions may render less positive game actions than straight path collisions.

In some embodiments, the digital element rotation 740 further influences game actions. The digital element rotation 740 is controlled by the user's motion controller or hand gestures. Where the user rotates within the applicable control scheme, the digital element 730 will rotate in game, in a corresponding fashion. In some embodiments of digital elements 730 have varied surfaces. Examples of varied surfaces include a bladed edge of a sword and the flat of a sword. In this example, where a user strikes the digital object 720 with a bladed edge (e.g., a cut), a different game action results than if the user strikes the digital object 720 with the flat side (e.g., a slap). In some embodiments, a cut renders a more positive game action than a slap.

FIGS. 8-16 illustrate screenshots of various graphical user interfaces (GUIs) of the game, which are generated by the gaming console 105 of FIG. 1.

Figure 8:
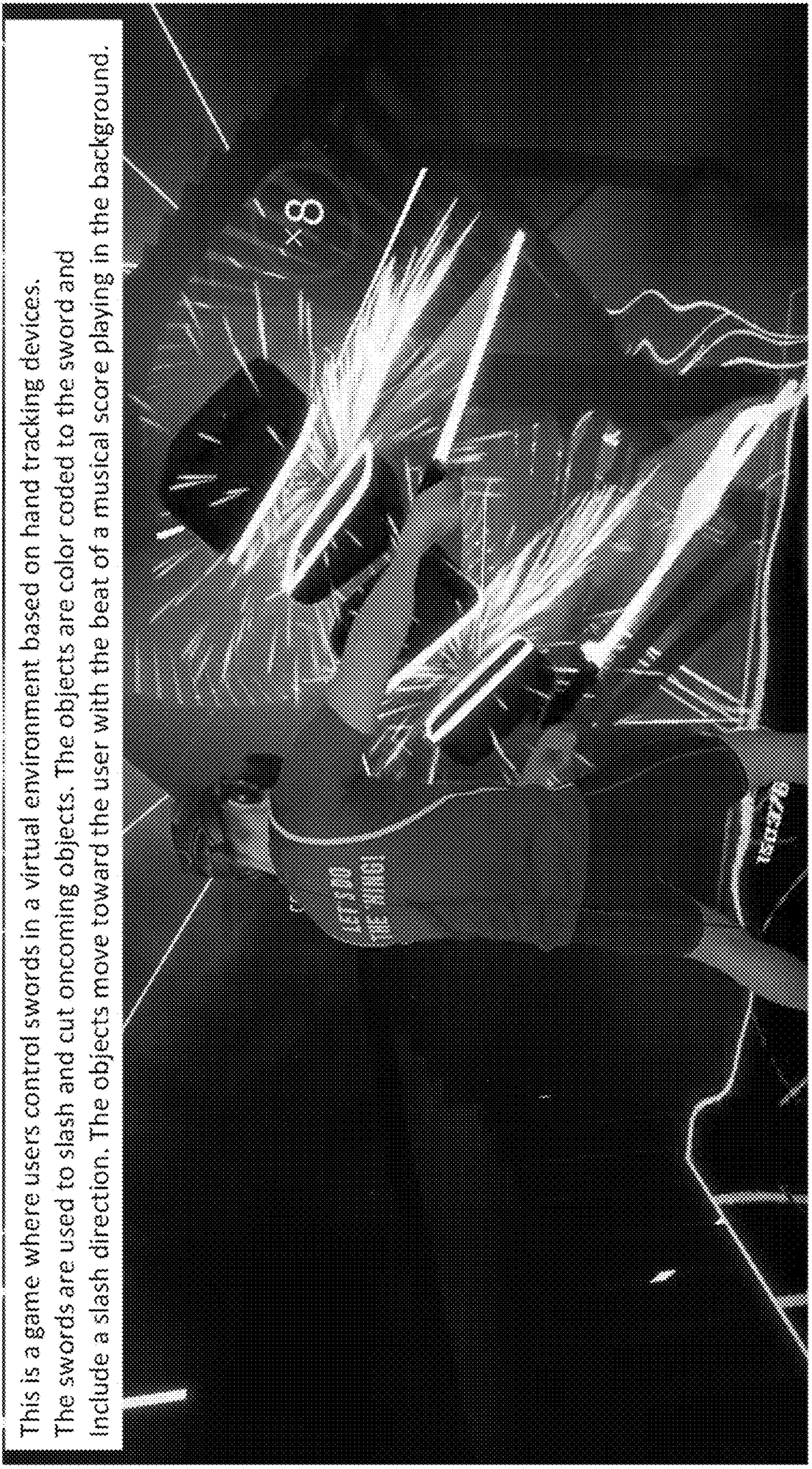
FIG. 8 is a screenshot of a player playing the game, consistent with various embodiments.

FIG. 8 is a screenshot of a player playing the game, consistent with various embodiments. In FIG. 8, the player is holding a pair of motion controllers in the hands which are depicted as digital sabers in the 3D virtual space of the game. FIG. 8 also illustrates the player slashing a pair of digital blocks.

Figure 9:
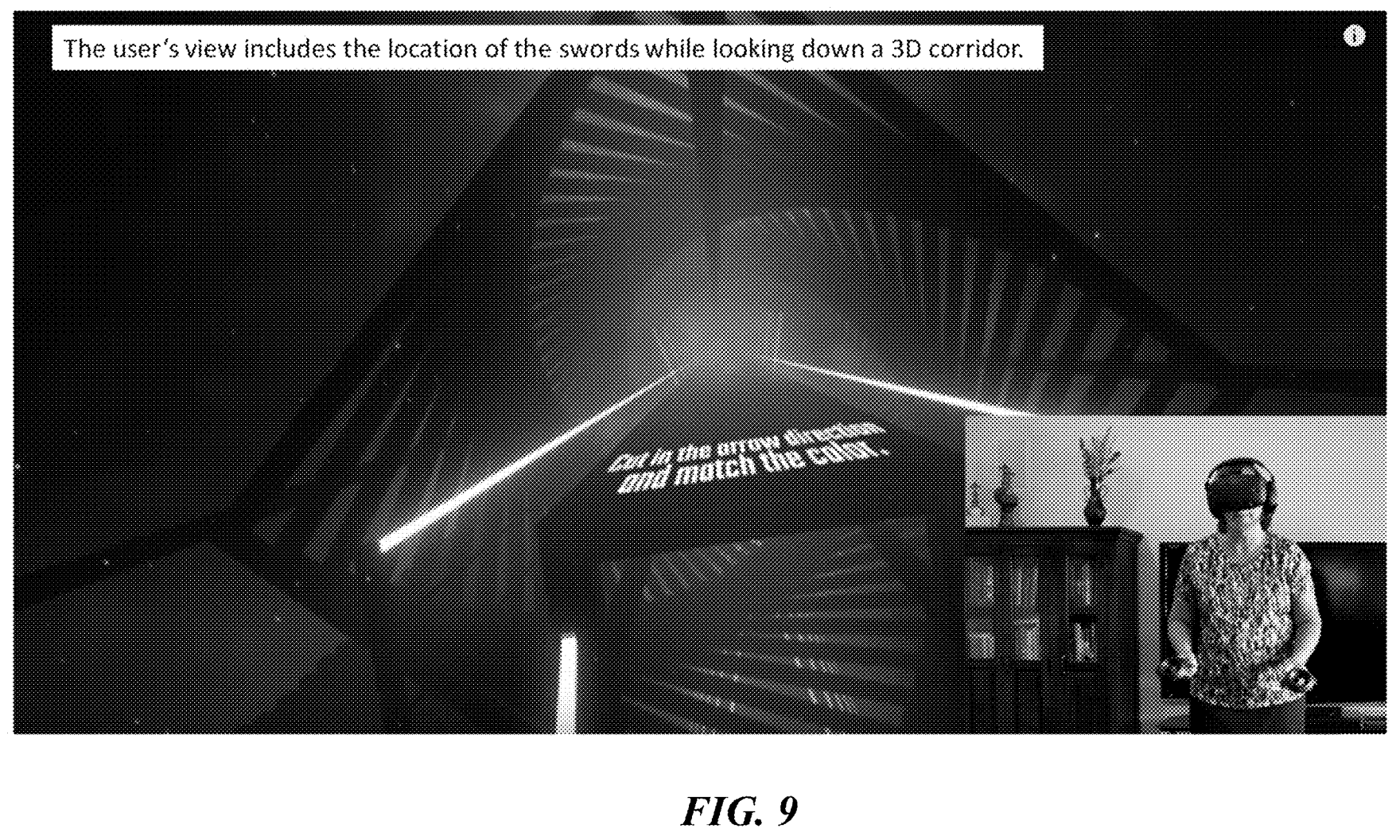

FIG. 9 is a screenshot of a player view of the 3D virtual space generated by the gaming console, consistent with various embodiments.

Figure 10:
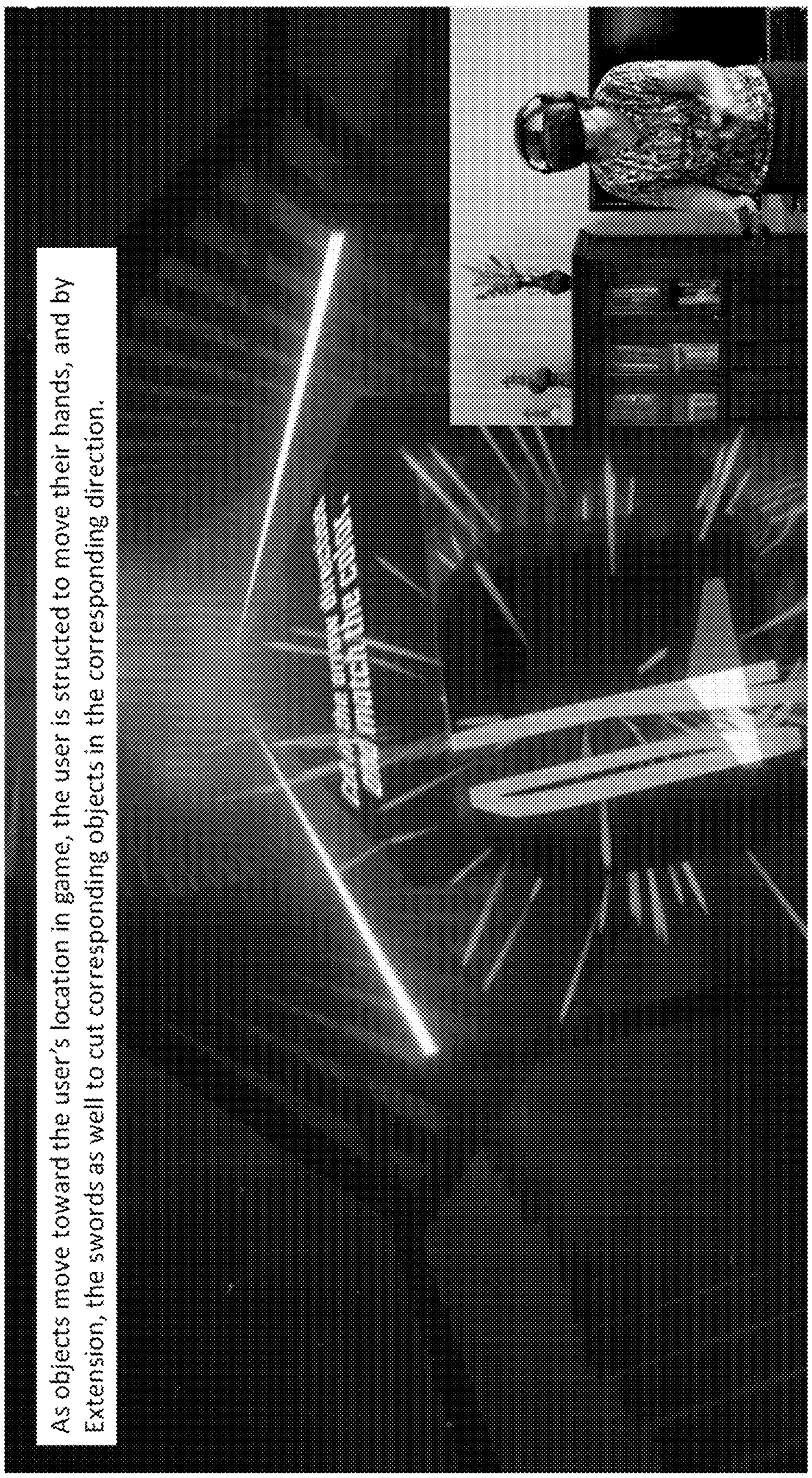
FIG. 10 is a screenshot of a graphical user interface (GUI) with instructions to the player, consistent with various embodiments.

FIG. 10 is a screenshot of a graphical user interface (GUI) with instructions to the player, consistent with various embodiments. In FIG. 10, the GUI instructs the player to move their hands so that the digital sabers cut the digital blocks in the indicated direction.

Figure 11:
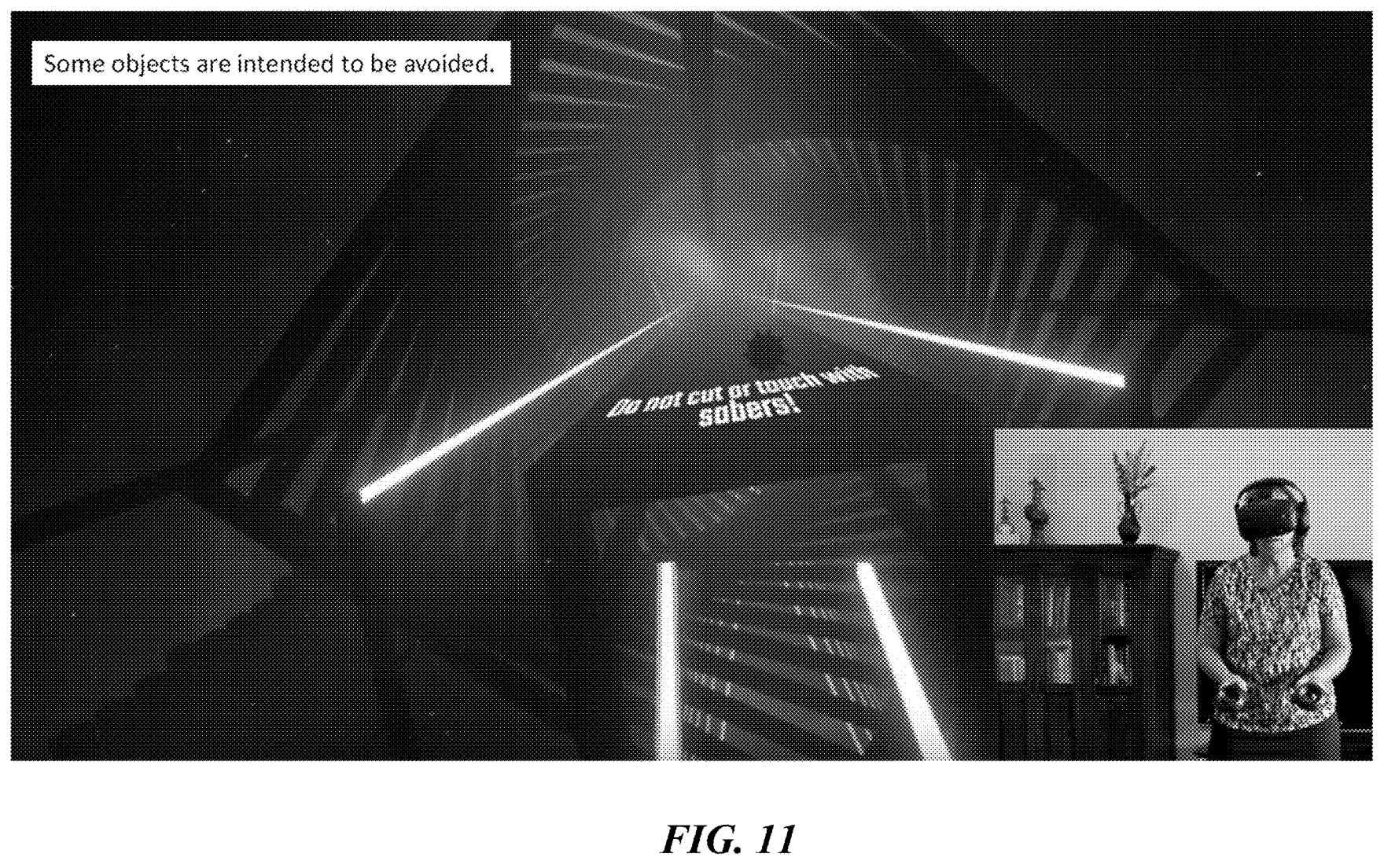

FIG. 11 is a screenshot of a GUI with instructions to the player, consistent with various embodiments. In FIG. 11, the GUI indicates to the player that some of the digital objects presented in the 3D virtual space are meant to be avoided, e.g., by not cutting or slashing the objects.

Figure 12A:
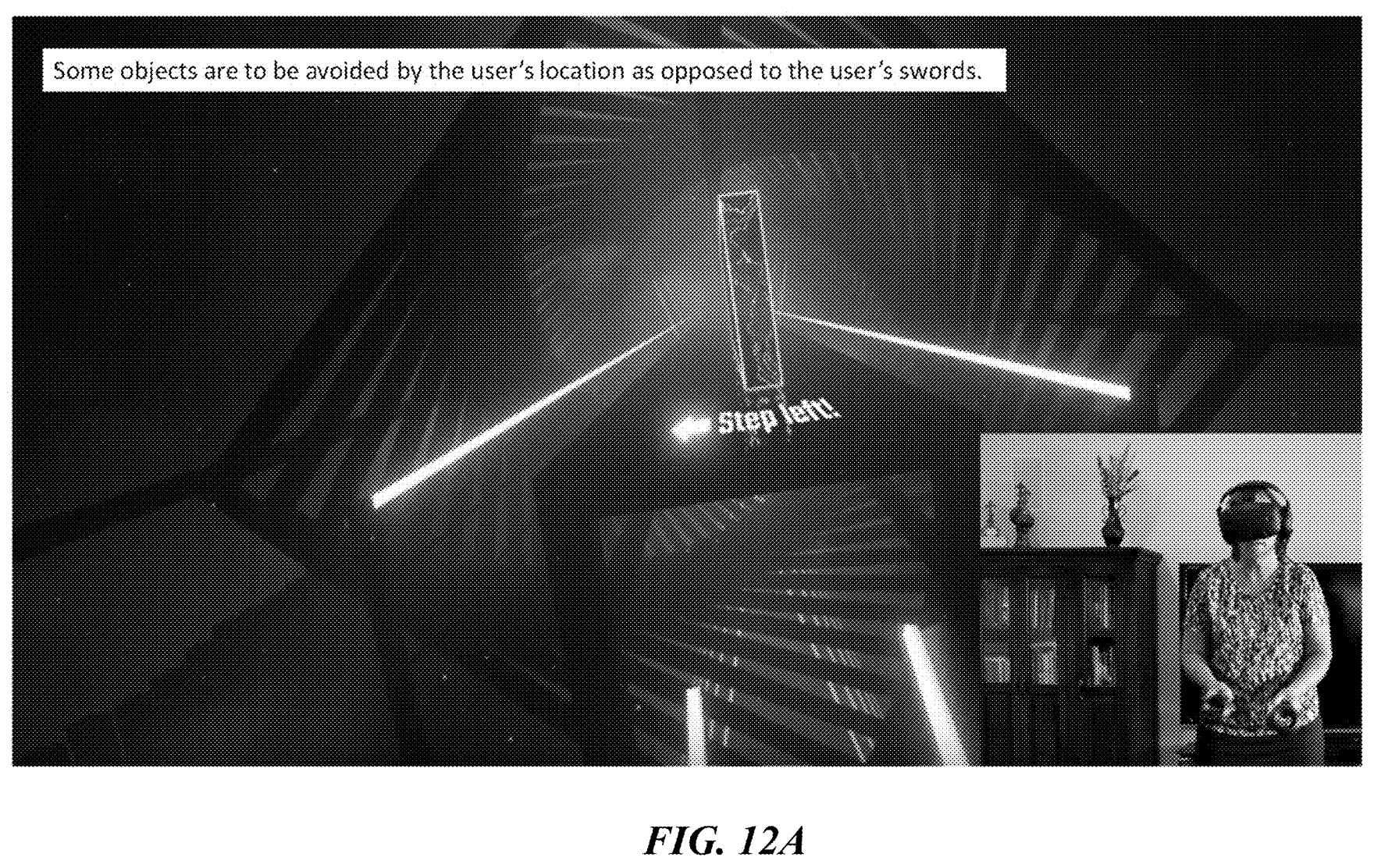

FIG. 12A is a screenshot of a GUI with instructions to the player, consistent with various embodiments. In FIG. 12A, the GUI indicates to the player that some of the digital objects presented in the 3D virtual space are to be avoided by player's location as opposed to avoiding using the digital sabers. For example, the player can duck, crouch or move to avoid to some of the digital objects.

Figure 12B:
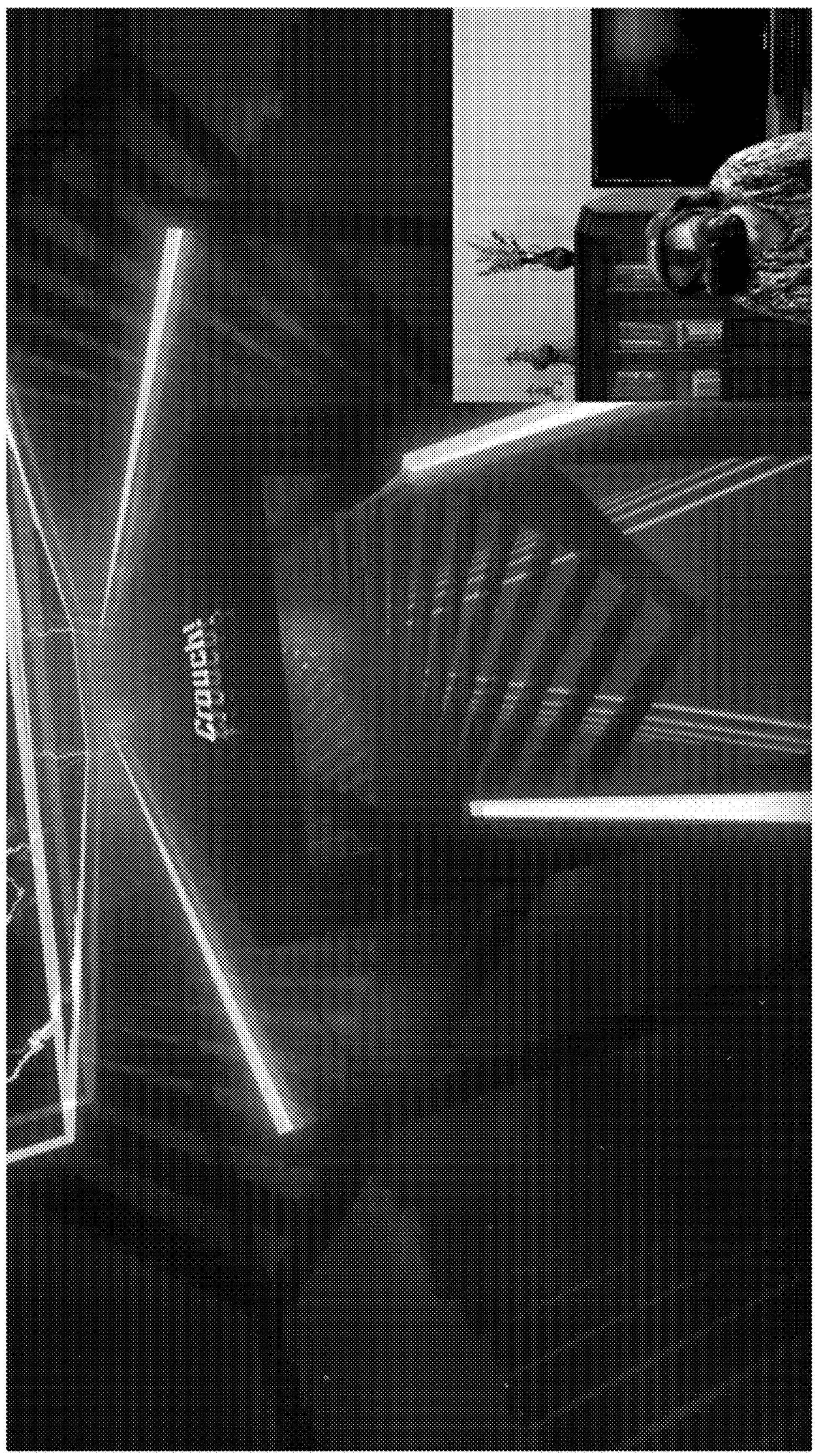
FIG. 12B is a screenshot of a GUI with instructions to the player, consistent with various embodiments.

FIG. 12B is a screenshot of a GUI with instructions to the player, consistent with various embodiments. In FIG. 12B, the GUI indicates to the player that some of the digital objects presented in the 3D virtual space are to be avoided by ducking or crouching.

FIG. 13 is a screenshot of a GUI with instructions to the player, consistent with various embodiments. In FIG. 13, the GUI indicates to the player that the player can gain points by cutting the correct digital objects and in the correct manner.

Figure 14:
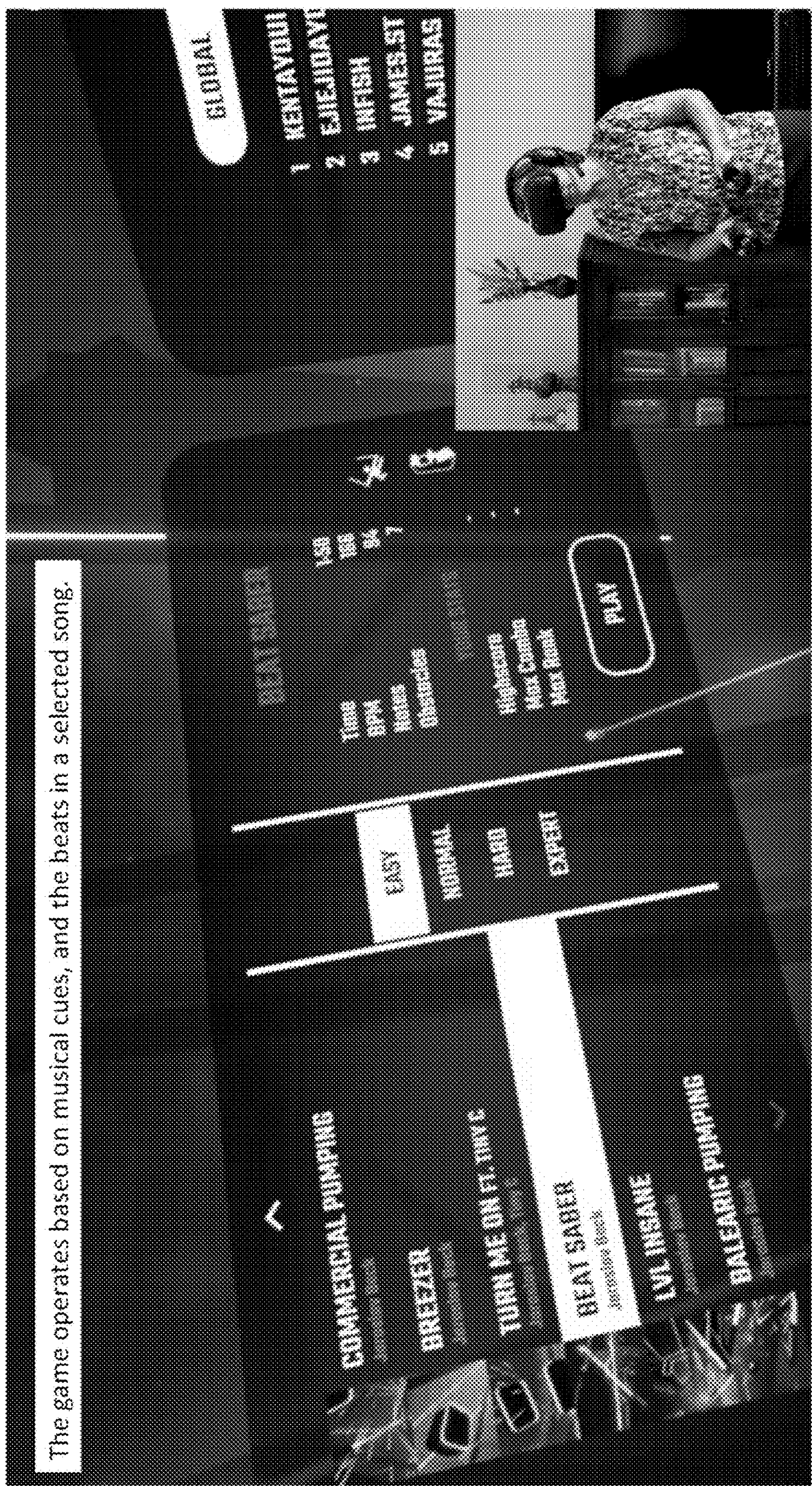
FIG. 14 is a screenshot of a GUI in which the player can select various options, consistent with various embodiments.

FIG. 14 is a screenshot of a GUI in which the player can select various options, consistent with various embodiments. In FIG. 14, the GUI presents the player with various songs to select from and a difficulty level of the game. Note that the digital objects are presented in the 3D virtual space based on the beats in the music.

Figure 15:
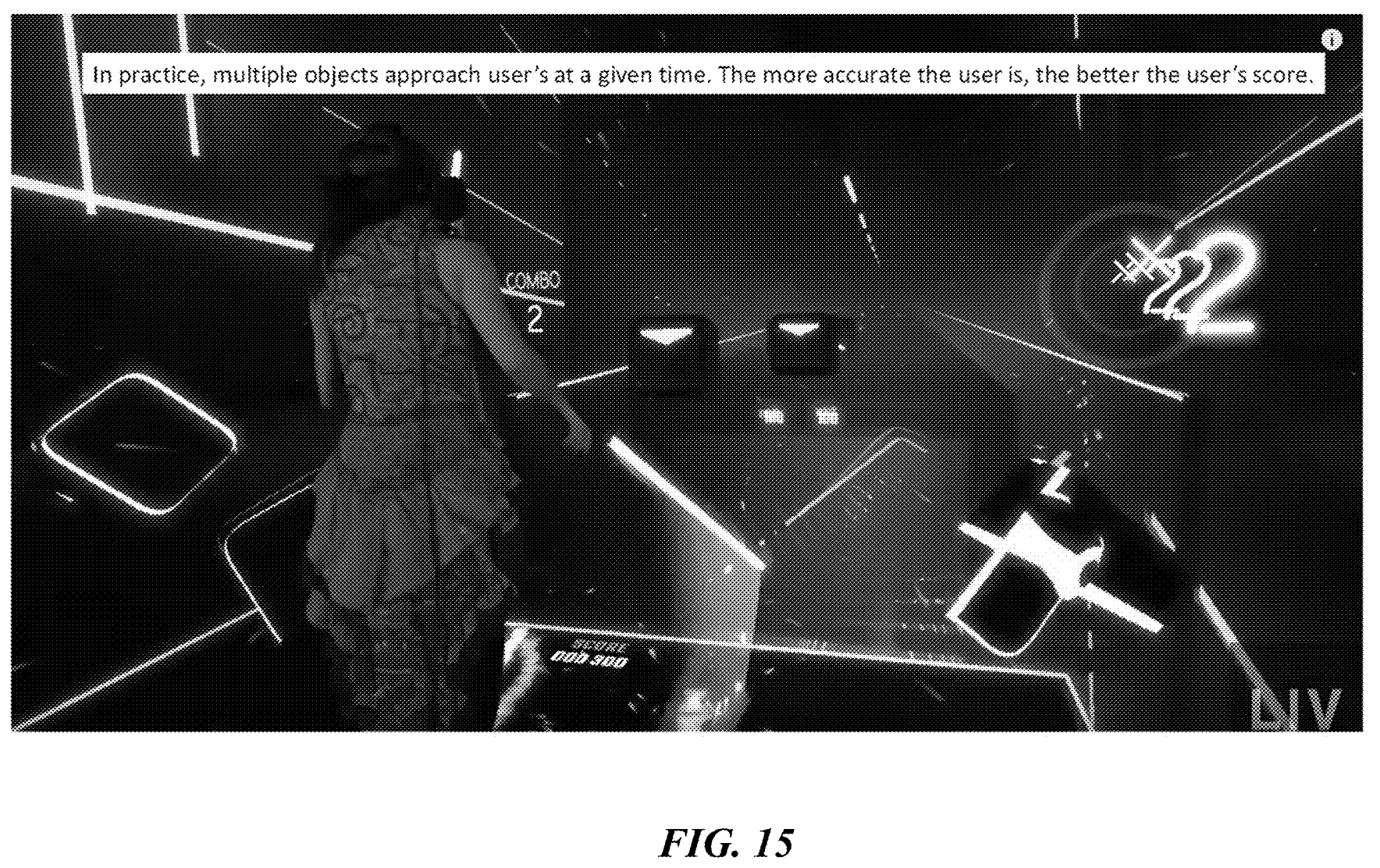

FIG. 15 is a screenshot of a GUI showing multiple digital objects approaching the player in the 3D virtual space, consistent with various embodiments.

Figure 16:
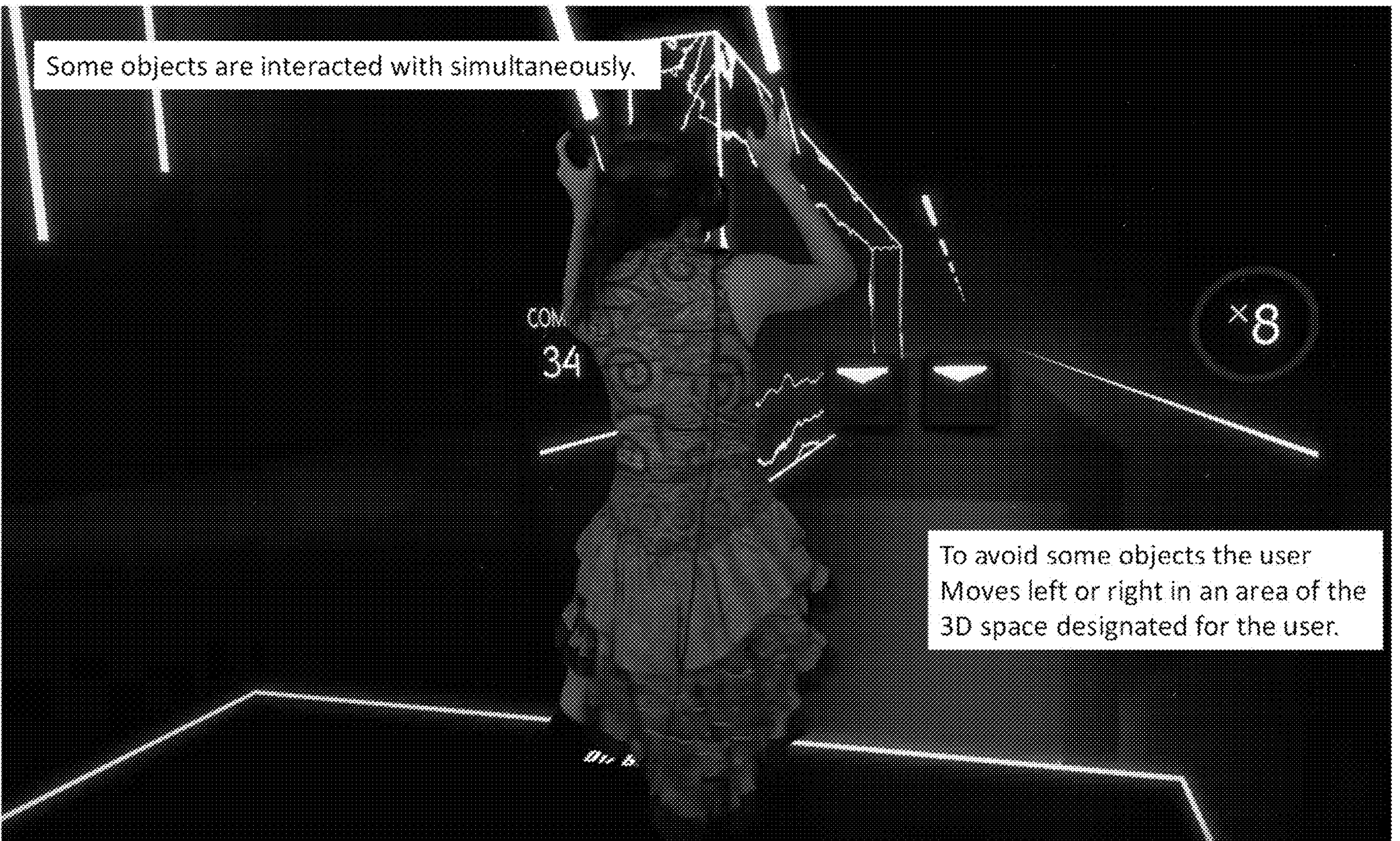
FIG. 16 is a screenshot of a GUI showing multiple digital objects approaching the player in the 3D virtual space, consistent with various embodiments.

FIG. 16 is a screenshot of a GUI showing multiple digital objects approaching the player in the 3D virtual space, consistent with various embodiments. In FIG. 16, the game presents digital blocks and digital obstacles simultaneously. The player has to slash the digital blocks but avoid the digital obstacles.

Figure 17:
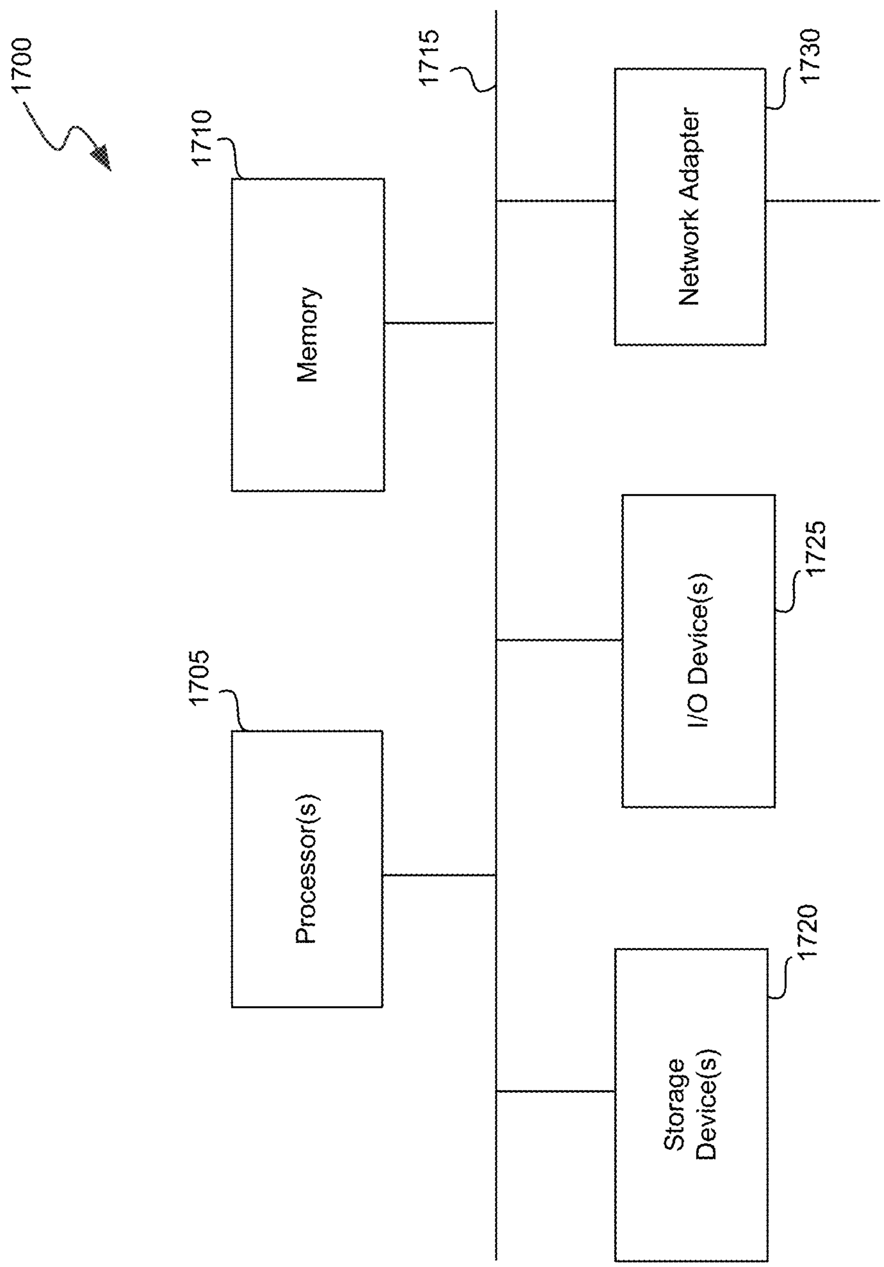
FIG. 17 is a block diagram of a computer system as may be used to implement features of some embodiments of the disclosed technology.

FIG. 17 is a block diagram of a computer system as may be used to implement features of some embodiments of the disclosed technology. The computing system 1700 may be used to implement any of the entities, components, modules, interfaces, or services depicted in the foregoing figures (and in this specification). The computing system 1700 may include one or more central processing units ("processors") 1705, memory 1710, input/output devices 1725 (e.g., keyboard and pointing devices, display devices), storage devices 1720 (e.g., disk drives), and network adapters 1730 (e.g., network interfaces) that are connected to an interconnect 1715. The interconnect 1715 is illustrated as an abstraction that represents any one or more separate physical buses, point to point connections, or both connected by appropriate bridges, adapters, or controllers. The interconnect 1715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1710 and storage devices 1720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1710 can be implemented as software and/or firmware to program the processor(s) 1705 to carry out actions described above. In some embodiments, such software or firmware may be initially provided to the processing system 1700 by downloading it from a remote system through the computing system 1700 (e.g., via network adapter 1730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A computer-readable storage medium storing instructions that, when executed by a computing system, cause the computing system to perform a process comprising:

instantiating a virtual space that includes a user location of a user;

rendering a plurality of digital targets that approach the user location, wherein one or more digital targets, of the plurality of digital targets, display an indication of a predetermined angle or orientation for effecting a first action in response to contacting the one or more digital targets; and detecting contacts between the one or more digital targets and one or more digital interface elements controlled by the user, wherein control of the one or more digital interface elements is based on a position and orientation of a respective hand of the user, wherein detected contacts that A) are between the one or more digital targets and a first digital interface element, of the one or more digital interface elements, and B) that occur at the predetermined angle or orientation, that the one or more targets display by the indication of the predetermined angle or orientation, effect the first action.

2. The computer-readable storage medium of claim 1, wherein detected contacts that A) are between the one or more digital targets and the first digital interface element, of the one or more digital interface elements, and B) that do not occur at the predetermined contact angle or orientation that the one or more targets display by the indication of the predetermined angle or orientation, effect a second action different from the first action.

3. The computer-readable storage medium of claim 1, wherein the predetermined angle or orientation is based on a relative orientation of the first digital interface element as compared to a respective digital target of the one or more digital targets.

4. The computer-readable storage medium of claim 1, wherein the one or more digital interface elements further include a second digital interface element;

wherein a first subset of digital targets, of the one or more digital targets, are linked with the first digital interface element via graphical indicators and a second subset of digital targets, of the one or more digital targets, are linked with the second digital interface element via graphical indicators; and wherein detected contacts that effect the first action further require that C) a colliding digital interface element and a corresponding digital target are linked.

5. A computing system comprising:

one or more processors; and one or more memories storing instructions that, when executed by the one or more processors, cause the computing system to perform a process comprising:

instantiating a virtual space that includes a user location of a user;

rendering a plurality of digital targets that approach the user location, wherein one or more digital targets, of the plurality of digital targets, display an indication of a predetermined angle or orientation for effecting a first action in response to contacting the one or more digital targets; and detecting contacts between the one or more digital targets and one or more digital interface elements controlled by the user, wherein control of the one or more digital interface elements is based on a position and orientation of a respective hand of the user, wherein detected contacts that A) are between the one or more digital targets and a first digital interface element, of the one or more digital interface elements, and B) that occur at the predetermined angle or orientation, that the one or more targets display by the indication of the predetermined angle or orientation, effect the first action.

6. The computing system of claim 5, wherein the first action is one of:

increasing a game score;

decreasing the game score;

effecting a pace of the approach of the one or more digital targets;

effecting a creation of the one or more digital targets;

effecting a rate of change in the game score; or any combination thereof.

7. The computing system of claim 5, wherein the process further comprises:

playing a musical score including musical notes, wherein a pace of movement of the plurality of digital targets approaching the user location is based on the musical notes.

8. The computing system of claim 7, wherein a pace of generation of the plurality of digital targets is based on the musical notes.

9. A method comprising:

instantiating a virtual space that includes a user location of a user and multiple digital interface elements, the multiple digital interface elements including a right-hand digital interface element and a left-hand hand digital interface element, wherein control of the multiple digital interface elements is based on a position and orientation of a respective pair of hands of the user;

rendering a plurality of digital targets viewable from and moving in relation to the user location, wherein the plurality of digital targets each include a graphic indicator, associating each respective digital target with one of the right-hand digital interface element or the left-hand digital interface element;

detecting contact between one of the multiple digital interface elements controlled by the user and a first digital target, wherein the graphic indicator of the first digital target corresponds to a first digital interface element of the multiple digital interface elements; and performing one of:

effecting a first action where the detected contact is between the first digital interface element that corresponds to the graphic indicator of the first digital target; or effecting a second action, different from the first action, where the detected contact is between a digital interface element other than the first digital interface element and does not correspond to the graphic indicator of the first digital target.

10. The method of claim 9, wherein rendering of the plurality of digital targets is timed to a musical track.

11. The method of claim 9, wherein the process further comprises:

effecting the second action in response to the user failing to cause a hit on a given digital target of the plurality of digital targets within a predetermined period of time.

12. A computing system comprising:

one or more processors; and one or more memories storing instructions that, when executed by the one or more processors, cause the computing system to perform a process comprising:

instantiating a virtual space that includes a user location of a user and multiple digital interface elements, the multiple digital interface elements including a right-hand digital interface element and a left-hand hand digital interface element, wherein control of the multiple digital interface elements is based on a position and orientation of a respective pair of hands of the user;

rendering a plurality of digital targets viewable from and moving in relation to the user location, wherein the plurality of digital targets each include a graphic indicator, associating each respective digital target with one of the right-hand digital interface element or the left-hand digital interface element;

detecting contact between one of the multiple digital interface elements controlled by the user and a first digital target, wherein the graphic indicator of the first digital target corresponds to a first digital interface element of the multiple digital interface elements; and performing one of:

effecting a first action where the detected contact is between the first digital interface element that corresponds to the graphic indicator of the first digital target; or effecting a second action, different from the first action, where the detected contact is between a digital interface element other than the first digital interface element and does not correspond to the graphic indicator of the first digital target.

13. The computing system of claim 12, wherein the graphic indicator of the first digital target further indicates a rotational orientation associated with the multiple digital interface elements, and wherein effecting the first action further requires that the first digital interface element is rotationally orientated, during the detected hit, according to the graphic indicator of the first digital target.

14. The computing system of claim 12, wherein the process further comprises:

rendering additional digital objects in the virtual space in addition to the plurality of digital targets, wherein the additional digital objects include a different interaction scheme than the plurality of digital targets.

15. The computing system of claim 12, wherein the first digital target includes a type criterion and the first action includes an effect style, wherein the effect style is based on the type criterion.

16. A method comprising:

instantiating a virtual space that includes a user location of a user and multiple digital interface elements ("elements") including a right element and a left element, and wherein control of the multiple digital interface elements is based on a position and orientation of a respective pair of hands of a user;

rendering a plurality of digital targets that approach the user, timed to an audio track, wherein the plurality of digital targets each include a graphic indicator indicating an association between each respective digital target and one of the right element or the left element;

detecting a connection, on a first digital target by the right element controlled by the user, by identifying a match with the right element, wherein the match is based on the association indicated by the graphic indicator of the first digital target; and effecting a first action in response to the detection of the connection.

17. The method of claim 16 further comprising:

detecting a second hit on a second digital target by the left element controlled by the user; and effecting the first action in response to the detection of the second hit, wherein the hit is a match with the left element, the match based on the association indicated by the graphic indicator of the second digital target.

18. The method of claim 16 further comprising:

detecting a second hit on a second digital target by a first element of the multiple elements controlled by the user; and effecting a second action in response to the detection of the second hit, wherein the second hit does not match with the first element, the lack of a match based on the association indicated by the graphic indicator of the second digital target.

19. A non-transitory computer-readable storage medium storing instructions that, when executed by a computing system, cause the computing system to perform a process comprising:

instantiating a virtual space that includes a user location of a user and multiple digital interface elements ("elements") including a right element and a left element, and wherein control of the multiple digital interface elements is based on a position and orientation of a respective pair of hands of a user;

rendering a plurality of digital targets that approach the user, timed to an audio track, wherein the plurality of digital targets each include a graphic indicator indicating an association between each respective digital target and one of the right element or the left element;

detecting a connection, on a first digital target by the right element controlled by the user, by identifying a match with the right element, wherein the match is based on the association indicated by the graphic indicator of the first digital target; and effecting a first action in response to the detection of the connection.

20. The non-transitory computer-readable storage medium of claim 19, wherein the process further comprises:

effecting the negative action in response to the user failing to cause a hit on a third digital target of the plurality of digital targets within a predetermined period of time of the third digital target approaching the user location.

* * * * *